(12) United States Patent
Coates et al.

(10) Patent No.: US 11,279,780 B2
(45) Date of Patent: Mar. 22, 2022

(54) POLYETHYLENE AND POLYPROPYLENE BLOCK COPOLYMERS

(71) Applicants: CORNELL UNIVERSITY, Ithaca, NY (US); REGENTS OF THE UNIVERSITY OF MINNESOTA, Minneapolis, MN (US)

(72) Inventors: Geoffrey Coates, Lansing, NY (US); James Eagan, Austin, TX (US); Anne Lapointe, Ithaca, NY (US); Frank S. Bates, St. Louis Park, MN (US)

(73) Assignees: CORNELL UNIVERSITY, Ithaca, NY (US); REGENTS OF THE UNIVERSITY OF MINNESOTA, Minneapolis, MN (US)

( * ) Notice: Subject to any disclaimer, the term of this patent is extended or adjusted under 35 U.S.C. 154(b) by 0 days.

(21) Appl. No.: 16/303,004

(22) PCT Filed: May 26, 2017

(86) PCT No.: PCT/US2017/034735
§ 371 (c)(1),
(2) Date: Nov. 19, 2018

(87) PCT Pub. No.: WO2017/205774
PCT Pub. Date: Nov. 30, 2017

(65) Prior Publication Data
US 2019/0300631 A1 Oct. 3, 2019

Related U.S. Application Data

(60) Provisional application No. 62/342,583, filed on May 27, 2016, provisional application No. 62/421,680, filed on Nov. 14, 2016.

(51) Int. Cl.
| | | |
|---|---|---|
| C08F 210/06 | (2006.01) | |
| C08F 4/64 | (2006.01) | |
| C08F 210/02 | (2006.01) | |
| C08F 297/08 | (2006.01) | |
| B32B 27/32 | (2006.01) | |
| C08L 23/06 | (2006.01) | |
| C08L 23/14 | (2006.01) | |
| C08L 53/00 | (2006.01) | |
| C09J 153/00 | (2006.01) | |
| B32B 27/08 | (2006.01) | |
| B32B 27/12 | (2006.01) | |
| B32B 7/12 | (2006.01) | |

(52) U.S. Cl.
CPC ............. *C08F 210/06* (2013.01); *B32B 7/12* (2013.01); *B32B 27/08* (2013.01); *B32B 27/12* (2013.01); *B32B 27/32* (2013.01); *C08F 4/64144* (2013.01); *C08F 210/02* (2013.01); *C08F 297/086* (2013.01); *C08L 23/06* (2013.01); *C08L 23/14* (2013.01); *C08L 53/00* (2013.01); *C09J 153/00* (2013.01); *B32B* *2250/02* (2013.01); *B32B 2250/03* (2013.01); *B32B 2250/242* (2013.01); *B32B 2262/0253* (2013.01); *B32B 2307/518* (2013.01); *B32B 2307/54* (2013.01); *B32B 2307/748* (2013.01)

(58) Field of Classification Search
CPC .. C08F 210/02; C08F 210/06; C08F 297/086; C08F 297/08; C08F 297/083
See application file for complete search history.

(56) References Cited

U.S. PATENT DOCUMENTS

| | | | |
|---|---|---|---|
| 5,804,286 A | 9/1998 | Quantrille et al. | |
| 8,686,087 B2 | 4/2014 | Li Pi Shan et al. | |
| 8,822,599 B2 | 9/2014 | Li Pi Shan et al. | |
| 8,921,484 B2 | 12/2014 | Liang et al. | |
| 9,511,567 B2 | 12/2016 | Hu et al. | |
| 2002/0055445 A1* | 5/2002 | Okada .................. | C10M 177/00 508/591 |
| 2003/0204017 A1 | 10/2003 | Stevens et al. | |
| 2011/0015363 A1 | 1/2011 | Marchand et al. | |
| 2017/0008263 A1* | 1/2017 | Hu ............................ | B32B 7/12 |
| 2018/0355224 A1* | 12/2018 | Chen ........................ | B32B 7/12 |

FOREIGN PATENT DOCUMENTS

| | | |
|---|---|---|
| WO | 2008/112133 A2 | 9/2008 |
| WO | 2011/163191 A1 | 12/2011 |
| WO | 2016/026120 A1 | 2/2016 |

OTHER PUBLICATIONS

International Search Report and Written Opinion of the International Searching Authority for PCT/US2017/034735 dated Aug. 11, 2017.
Lovinger, A.J., et al., "Tensile properties and morphology of blends of polyethylene and polypropylene", Journal of Applied Polymer Science, vol. 25, Issue 8, Abstract Only (1980).
Rachtanapun, P., et al., "Relationship Between Cell Morphology and Impact Strength of Microcellular Foamed High-Density Polyethylene/Polypropylene Blend", Polymer Engineering and Science, vol. 44, No. 8, pp. 1551-1560 (2004).

(Continued)

*Primary Examiner* — Jeffrey C Mullis
(74) *Attorney, Agent, or Firm* — Heslin Rothenberg Farley & Mesiti PC.

(57) ABSTRACT

A semicrystalline multiblock copolymer includes alternating blocks of semicrystalline isotactic polypropylene (iPP) and semicrystalline polyethylene (PE), having a block arrangement according to formula (I):

$$(iPP_w)_p(PE_x)(iPP_y)_m(PE_z)_n \qquad (I),$$

wherein p is 0 or 1; m is 0 or 1; n is 0 or 1; the sum of p, m, and n is 1, 2, or 3; and the sum of w, x, y, and z is greater than or equal to 40 kg/mol, with the provisos that: when m and n are 0, the sum of w and x is greater than or equal to 140 kg/mol; and when p and n are 0, the sum of y and x is greater than or equal to 140 kg/mol. Related compositions and methods are also provided.

23 Claims, 24 Drawing Sheets

(56) References Cited

OTHER PUBLICATIONS

Teh, J.W., "Structure and properties of polyethylene-polypropylene blend", Journal of Applied Polymer Science, vol. 28, Issue 2, Abstract Only (1983).

* cited by examiner

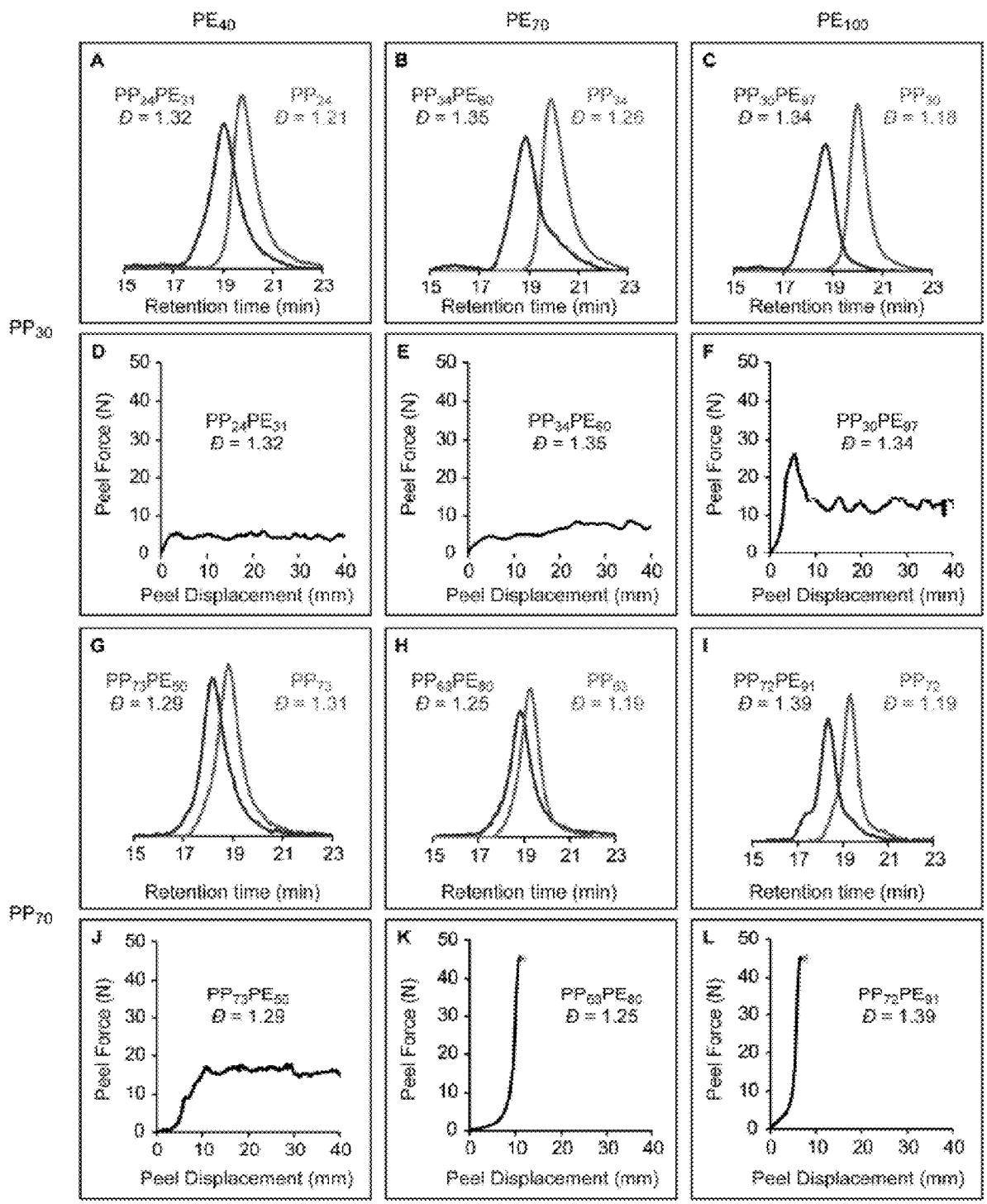
FIGS. 11A-L

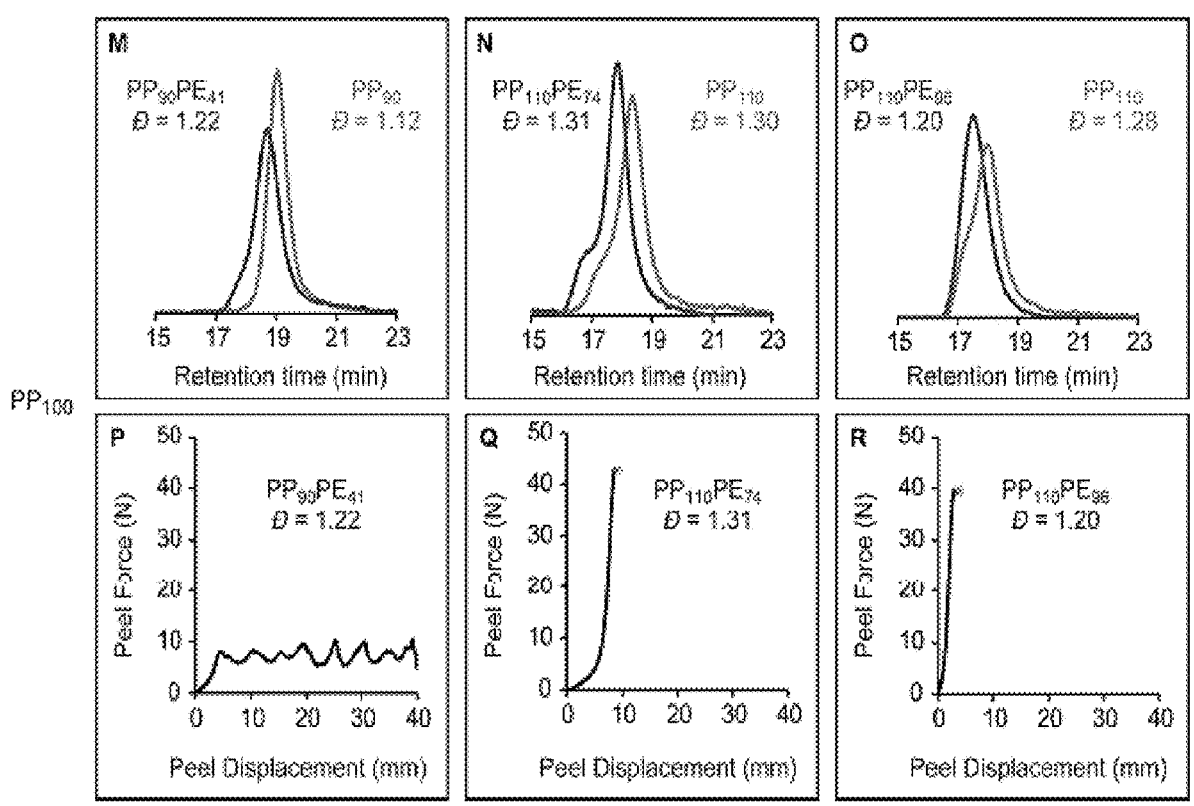
FIGS. 11M-R

FIG. 21A
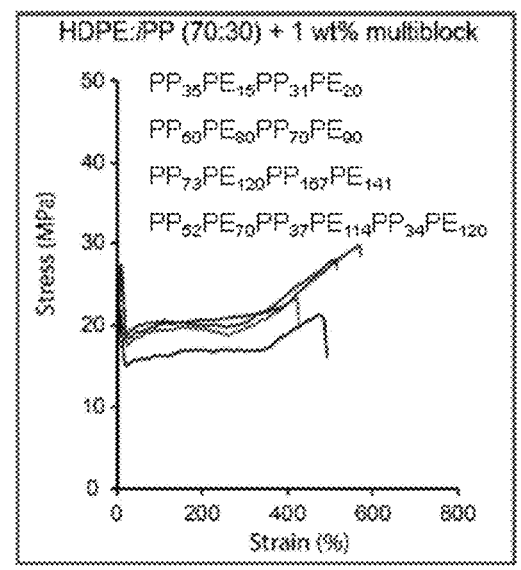
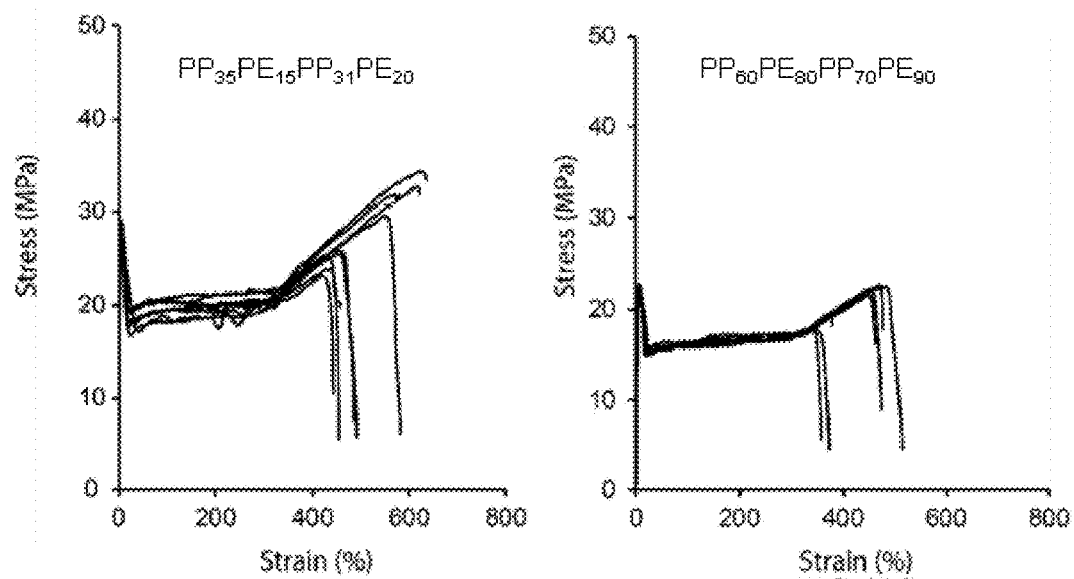
FIG. 21B
FIG. 21C
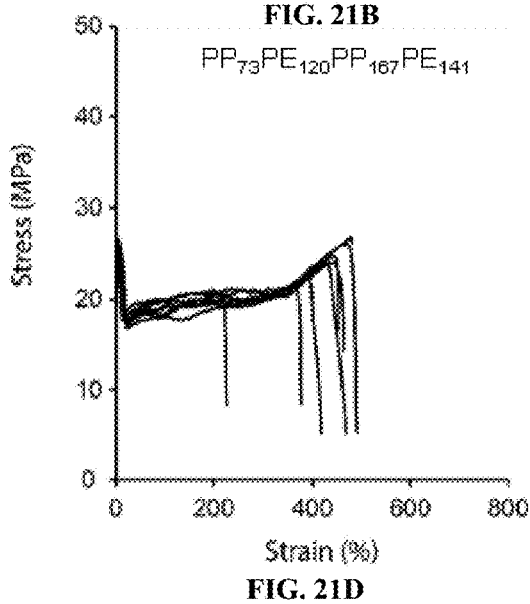
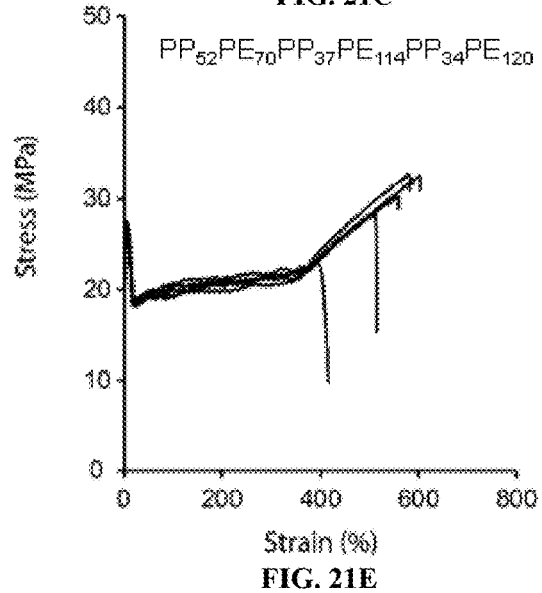
FIG. 21D
FIG. 21E FIG. 22A
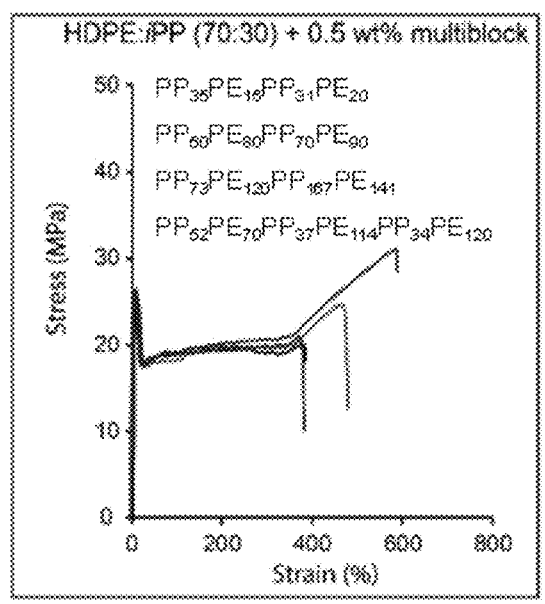
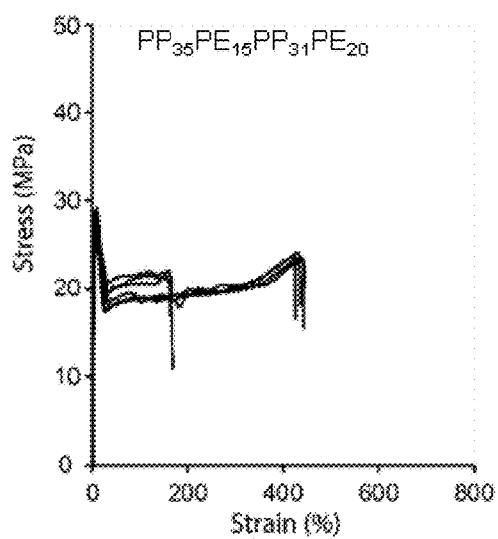
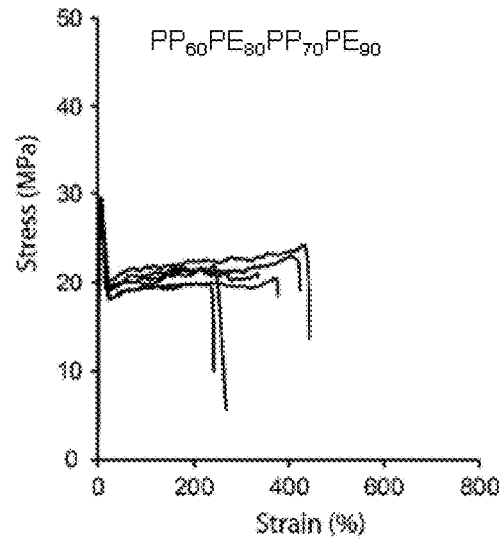
FIG. 22B
FIG. 22C
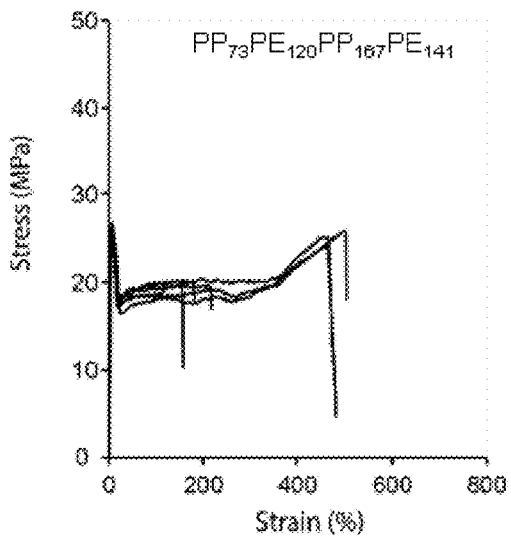
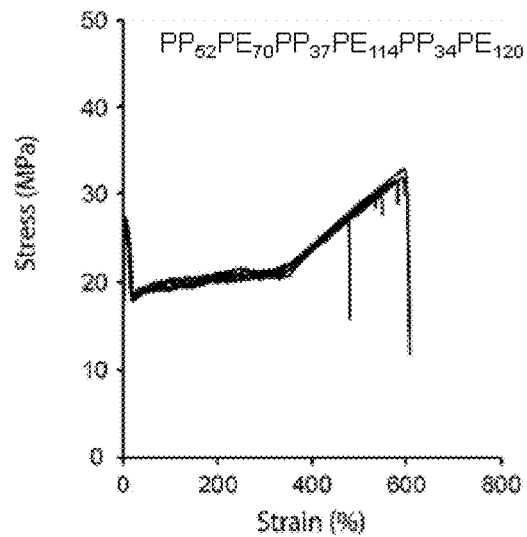
FIG. 22D
FIG. 22E FIG. 23A
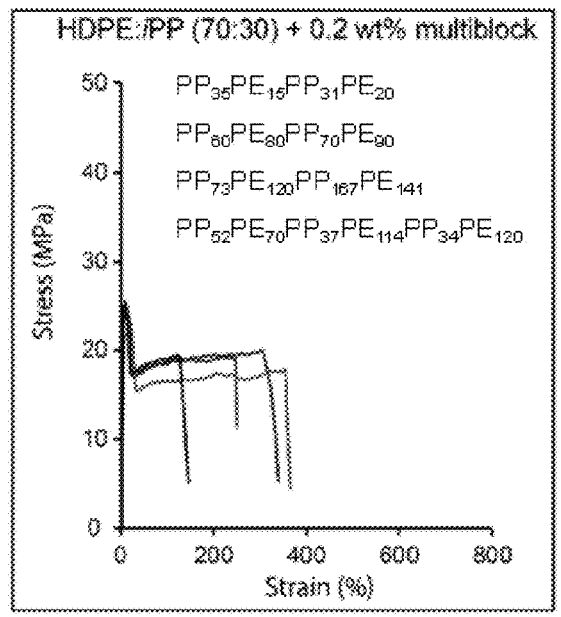
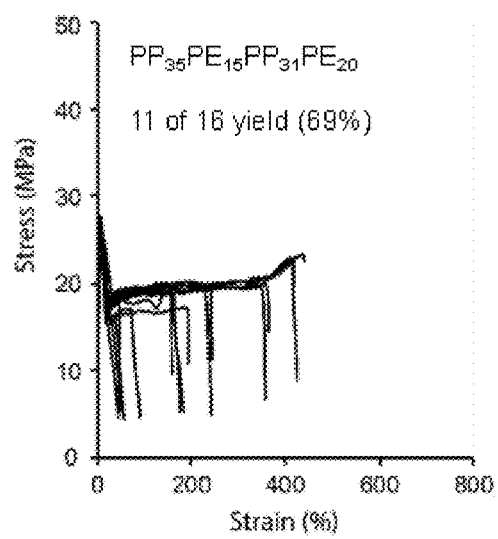
FIG. 23B
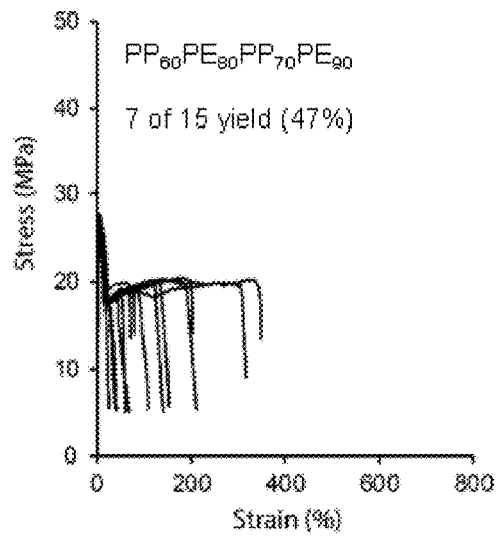
FIG. 23C
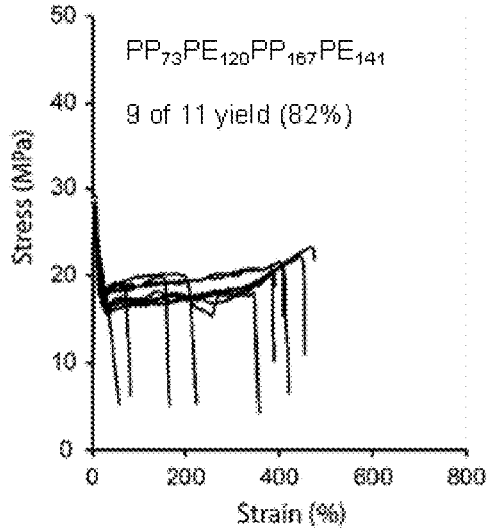
FIG. 23D
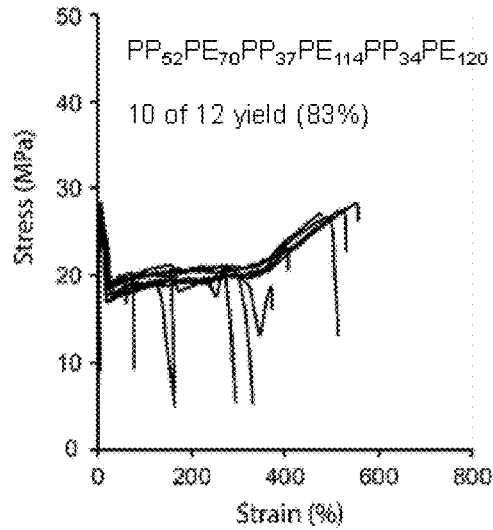
FIG. 23E

POLYETHYLENE AND POLYPROPYLENE BLOCK COPOLYMERS

CROSS-REFERENCE TO RELATED APPLICATIONS

This application is a U.S. national phase entry under Section 371 of International Application No. PCT/US2017/034735, filed May 26, 2017, which published as WO 2017/205774 A1, which claims priority to U.S. Provisional Patent Application No. 62/342,583, filed May 27, 2016, and to U.S. Provisional Patent Application No. 62/421,680, filed Nov. 14, 2016. The entire disclosures of each of the prior applications are hereby incorporated by reference herein in their entirety.

GOVERNMENT FUNDING

This invention was made with Government support under Grant Number CHE-1413862 awarded by the National Science Foundation (NSF). The United States Government has certain rights in this invention.

FIELD OF THE INVENTION

This invention relates to, inter alia, polyethylene and polypropylene block copolymers, and to use of the block copolymers in adhering and/or compatibilizing polyethylene and polypropylene.

BACKGROUND

Polyethylene (PE) and isotactic polypropylene (iPP) are the two most abundantly produced plastics worldwide. Over 70 million and 50 million metric tons of PE and iPP, respectively, are produced annually. The vast majority of polyethylene (PE) and isotactic polypropylene (iPP) are prepared using heterogeneous chromium and titanium catalysts. Heterogeneous olefin polymerization catalysts have a multitude of active sites, each with their own reactivity differences which give rise to polymers of different molecular weights, molecular weight distributions, and microstructures. In the case of PE and iPP, these differences and their phase separation inhibit interfacial adhesion and erode the mechanical properties of melt blends, thereby significantly encumbering the reusability of PE and iPP.

Only about 5% of the value of PE and iPP is retained when recycled, typically into lower-value products as a result of sorting expenses and degraded physical properties, ultimately hindering the sustainable re-use of plastic. Since PE and iPP are immensely important economically (ca.>$200 billion in annual sales, worldwide) any new strategy that allows these materials to be adhered and/or combined into composites will have significant potential to impact sustainability and the economy.

Despite many desirable physical properties of each plastic, adhering PE and iPP presents significant difficulties. Achieving adhesion generally requires use of PE and iPP produced by homogenous catalysts (less than 10% of production), or use of energy intensive and/or expensive surface functionalization. Compatibilizers open opportunities for upcycling recovered PE/iPP into equal or higher value materials with lower sorting costs. However, strategies to compatibilize iPP and PE rely on the addition of large amounts (usually at least 10 weight percent (wt %)) of additives, typically amorphous polymers. Since PE and iPP are immensely important economically (ca.>$200 billion in annual sales, worldwide), strategies to combine these materials may have significant potential to impact sustainability and the economy.

Thus, a need exists for technology that allows for the improved adherence or compatibilization of PE and iPP.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

In this specification, where a document, act or item of knowledge is referred to or discussed, this reference or discussion is not an admission that the document, act or item of knowledge or any combination thereof was, at the priority date, publicly available, known to the public, part of common general knowledge, or otherwise constitutes prior art under the applicable statutory provisions; or is known to be relevant to an attempt to solve any problem with which this specification is concerned.

SUMMARY OF THE INVENTION

Briefly, the present invention satisfies the need for technology that allows for the improved adherence or compatibilization of PE and iPP. In particular, the invention provides block polymers of PE and iPP that are useful in, inter alia, adhering and/or compatibilizing/blending PE and iPP.

Embodiments of the invention may address one or more of the problems and deficiencies discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

Certain embodiments of the presently-disclosed block copolymers and related compositions and methods have several features, no single one of which is solely responsible for their desirable attributes. Without limiting the scope of the copolymers, compositions, and methods as defined by the claims that follow, their more prominent features will now be discussed briefly. After considering this discussion, and particularly after reading the section of this specification entitled "Detailed Description of the Invention," one will understand how the features of the various embodiments disclosed herein provide a number of advantages over the current state of the art. These advantages may include, without limitation, the provision of new block copolymers that provide for improved adherence and/or blending of PE and iPP, and that allow for PE and iPP compositions (including films and blends) having improved properties such as, e.g., improved strength, mechanical toughness, and/or morphology.

In a first aspect, the invention provides a semicrystalline multiblock copolymer comprising alternating blocks of semicrystalline isotactic polypropylene (iPP) and semicrystalline polyethylene (PE), having a block arrangement according to formula (I):

$$(iPP_w)_p(PE_x)(iPP_y)_m(PE_z)_n \qquad (I),$$

wherein
p is 0 or 1;
m is 0 or 1;
n is 0 or 1;
the sum of p, m, and n is 1, 2, or 3; and
the sum of w, x, y, and z is greater than or equal to 40 kg/mol, with the provisos that:

when m and n are 0, the sum of w and x is greater than or equal to 140 kg/mol; and when p and n are 0, the sum of y and x is greater than or equal to 140 kg/mol.

In a second aspect, the invention provides an adhesion layer comprising the semicrystalline multiblock copolymer according to the first aspect of the invention.

In a third aspect, the invention provides a multi-layer film or sheet comprising:
 a first layer comprising polyethylene;
 a second layer comprising polypropylene; and
 an adhesion layer comprising the semicrystalline multiblock copolymer according to the first aspect of the invention,
wherein the adhesion layer is disposed between the first layer and the second layer, and is in direct contact with the first layer and the second layer.

In a fourth aspect, the invention provides a method of adhering a first layer comprising polyethylene and a second layer comprising polypropylene, the method comprising: contacting the first layer and the second layer with an adhesive composition comprising a semicrystalline multiblock copolymer according to the first aspect of the invention.

In a fifth aspect, the invention provides a blended composition comprising polypropylene, polyethylene, and a semicrystalline multiblock copolymer according to the first aspect of the invention.

In a sixth aspect, the invention provides a process for forming the semicrystalline multiblock copolymer according to the first aspect of the invention, said process comprising:
 in a reactor, in a non-polar, non-protic solvent, contacting propylene monomers with a catalyst, thereby forming an iPP block;
 introducing ethylene monomers to the reactor, thereby forming a PE block covalently bonded to the iPP block, thus forming a semicrystalline diblock copolymer; and
 optionally, performing one or more additional steps of introducing to the reactor propylene and/or ethylene monomers, thus forming a semicrystalline multiblock copolymer having additional blocks.

These and other objects, features, and advantages of this invention will become apparent from the following detailed description of the various aspects of the invention taken in conjunction with the accompanying drawings.

BRIEF DESCRIPTION OF THE DRAWINGS

The present invention will hereinafter be described in conjunction with the following drawing figures. The depicted figures serve to illustrate various embodiments of the invention. However, the invention is not limited to the precise arrangements and instrumentalities of the embodiments depicted in the drawings.

FIGS. 11A-R show results of GPC analysis and adhesion testing with diblock copolymers. In particular, depicted is: (11A-C) GPC analysis of low $M_n$ iPP diblock copolymers with increasing $M_n$ of PE blocks and (11D-F) their representative peel forces of PE/block copolymer/iPP laminates. (11G-I) GPC analysis of moderate $M_n$ iPP diblock copolymers with increasing $M_n$ of PE blocks and (11J-L) their representative peel forces of PE/block copolymer/iPP laminates. (11M-O) GPC analysis of high $M_n$ iPP diblock copolymers with increasing $M_n$ of PE blocks and (11P-R) their representative peel forces of PE/block copolymer/iPP laminates. Elongation of PE film is poor due to rectangular shaped specimens rather than dogbone shaped which distribute stresses evenly.

FIGS. 21A-E are charts summarizing tensile properties of 70:30 (HDPE:iPP) blend embodiments with the indicated multiblock copolymers added in 1 wt %.

FIGS. 22A-E are charts summarizing tensile properties of 70:30 (HDPE:iPP) blend embodiments with the indicated multiblock copolymers added in 0.5 wt %.

FIGS. 23A-E are charts summarizing tensile properties of 70:30 (HDPE:iPP) blend embodiments with the indicated multiblock copolymers added in 0.2 wt %.

DETAILED DESCRIPTION OF THE INVENTION

Figure 1A:
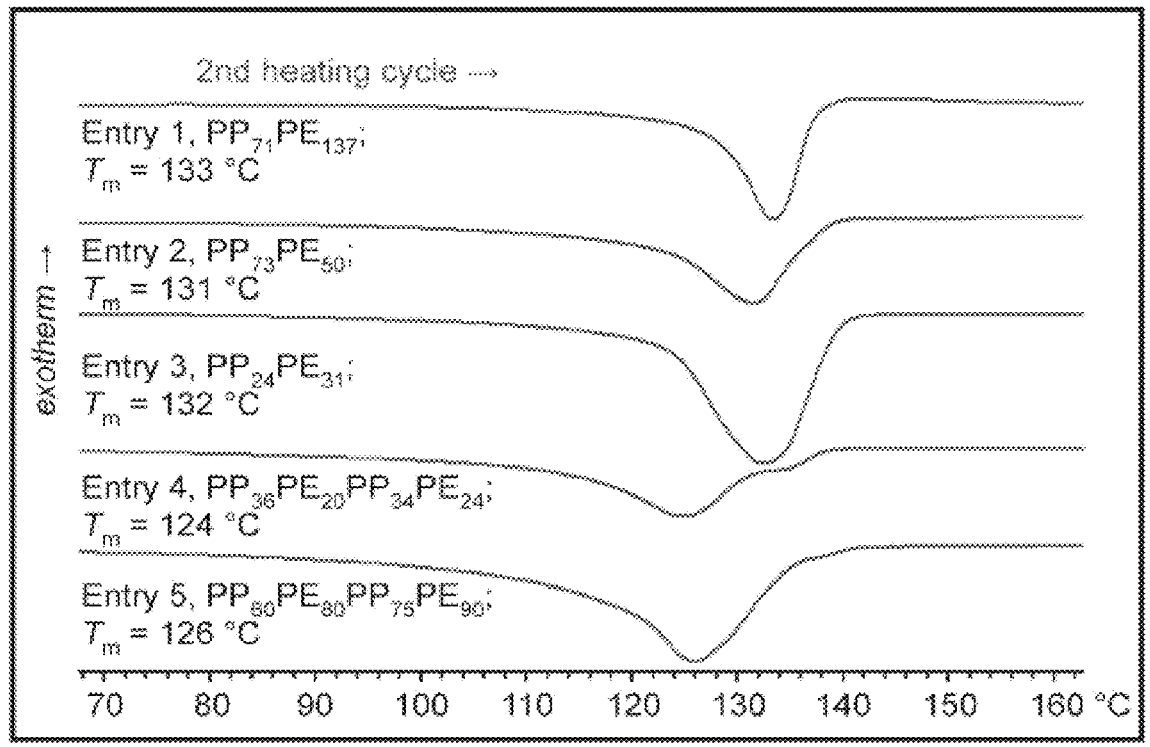
FIGS. 1A and 1B are DSC curves showing melting temperatures and crystallization temperatures, respectively, for multiblock copolymers according to certain embodiments of the invention.

The present invention relates to, inter alia, a semicrystalline PE/iPP multiblock copolymer, to compositions comprising the copolymer, and to related methods.

Aspects of the present invention and certain features, advantages, and details thereof are explained more fully below with reference to the non-limiting embodiments discussed and illustrated in the accompanying drawings. Descriptions of well-known materials, fabrication tools, processing techniques, etc., are omitted so as to not unnecessarily obscure the invention in detail. It should be understood, however, that the detailed description and the specific examples, while indicating embodiments of the invention, are given by way of illustration only, and are not by way of limitation. Various substitutions, modifications, additions and/or arrangements within the spirit and/or scope of the underlying inventive concepts will be apparent to those skilled in the art from this disclosure.

A discussed above, most PE and iPP are immiscible. Embodiments of the inventive multiblock copolymers discussed herein advantageously allow for adherence of, and compatibilization and effective blending of the two plastics.

In one aspect, the invention provides a semicrystalline multiblock copolymer comprising alternating blocks of semicrystalline isotactic polypropylene (iPP) and semicrystalline polyethylene (PE), having a block arrangement according to formula (I):

$$(iPP_w)_p(PE_x)(iPP_y)_m(PE_z)_n \qquad (I),$$

wherein
p is 0 or 1;
m is 0 or 1;
n is 0 or 1;
the sum of p, m, and n is 1, 2, or 3; and
the sum of w, x, y, and z is greater than or equal to 40 kg/mol, with the provisos that:
when m and n are 0, the sum of w and x is greater than or equal to 140 kg/mol; and
when p and n are 0, the sum of y and x is greater than or equal to 140 kg/mol.

As indicated above, the inventive semicrystalline multiblock copolymer comprises alternative blocks of semicrystalline iPP and semicrystalline PE, and comprises a block arrangement of formula (I): $(iPP_w)_p(PE_x)(iPP_y)_m(PE_z)_n$. "Blocks" are chemically distinct regions or segments joined (covalently bonded) in a linear manner, that is, end-to-end. The inventive copolymer is a multiblock copolymer, i.e., it contains two or more blocks, and it is semicrystalline. The iPP and PE blocks within the inventive multiblock copolymers are semicrystalline blocks. The term "semicrystalline" means that the copolymer or block being identified by the term has a first order transition or crystalline melting point ($T_m$) as determined by differential scanning calorimetry (DSC).

Without wishing to be held to any theory, it is believed that embodiments of the inventive multiblock copolymer work as effectively as they do due to the ability of the blocks to co-crystallize. This means that as long as the blocks are sufficiently crystalline to co-crystallize they will be effective. Thermal melting transitions, mentioned above, are a good measure of this in polymers. The description of the nature of the multiblock copolymers and the blocks comprised therein as semicrystalline is not meant to imply that no transition region exists between blocks. As will be appreciated by persons having ordinary skill in the art, between alternating blocks, block copolymers often comprise short transition regions (typically these regions represent less than about 1 wt % of the entire multiblock copolymer, and do not appear on NMR spectroscopy), that comprise both iPP and PE repeating units. Thus, in a multiblock copolymer having a block arrangement of formula (I), $(iPP_w)_p(PE_x)(iPP_y)_m(PE_z)_n$, transition regions may occur between the blocks (e.g., transition regions "b" may exist as follows: $(iPP_w)_pb(PE_x)b(iPP_y)_mb(PE_z)_n$). The transition regions are typically non-crystalline, however, since the transition between alternating blocks is sharp and the regions are comparatively very small, the semicrystalline nature of the multiblock copolymers is not materially affected. The block copolymers still have a first order transition or crystalline melting point ($T_m$) as determined by DSC, and the short transition regions do not affect the function of the multiblock copolymers.

In some embodiments, the semicrystalline multiblock copolymer or block has a $T_m$ of greater than 79° C. (e.g., greater than 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, or 120° C.). In particular embodiments, the semicrystalline multiblock copolymer or block has a $T_m$ of greater than 100° C., or greater than 120° C. In some embodiments, the semicrystalline multiblock copolymer or block has a $T_m$ of from 80° C. to 165° C. (e.g., 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, or 165° C.), including any and all ranges and subranges therein (e.g., 100° C. to 165° C., 110° C. to 150° C., 115° C. to 138° C., 120° C. to 134° C., etc.).

Embodiments of the multiblock copolymer are linear multiblock copolymers (i.e., the arrangement of the blocks is linear).

In some references to block copolymers made herein and in the accompanying drawings, iPP blocks may be referred to as PP blocks. Even where the i is omitted, the blocks are isotactic polypropylene blocks.

There are four blocks depicted in formula (I): (1) $(iPP_w)_p$; (2) $(PE_x)$; (3) $(iPP_y)_m$; and (4) $(PE_z)_n$. As indicated above, p, m, and n are independently 0 (i.e., the indicated block is absent) or 1 (i.e., the indicated block is present). Thus, for example, when p is 1 and m and n are 0, the inventive multiblock copolymer embodiment is a block copolymer having a block arrangement of formula: $iPP_wPE_x$.

In formula (I), w, x, y, and z are the number average molecular weights ($M_n$), in kg/mol, of the blocks (1), (2), (3), and (4), respectively. For example, a block copolymer of formula $iPP_{35}PE_{15}iPP_{31}PE_{20}$ is a multiblock copolymer having (and, in this case, consisting of) a block arrangement of $iPP_wPE_xiPP_yPE_z$, wherein w=35 kg/mol (i.e., the first block (1) has a molecular weight of 35 kg/mol), x=15 kg/mol (i.e., the second block (2) has a molecular weight of 15 kg/mol), y=31 kg/mol (i.e., the third block (3) has a molecular weight of 31 kg/mol), and z=20 kg/mol (i.e., the fourth block (4) has a molecular weight of 20 kg/mol). As would be readily understood by a person having ordinary skill in the art, where a block is absent, it will not have a molecular weight (e.g., for a block copolymer of formula $iPP_wPE_x$, the third (3) and fourth (4) blocks are absent, i.e., m and n are 0, and thus y and z are also 0).

The sum of w, x, y, and z is at least 40 kg/mol. Thus, the semicrystalline multiblock copolymer has a molecular weight of at least 40 kg/mol.

In some embodiments, the semicrystalline multiblock copolymer has a molecular weight of at least 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, or 140 kg/mol.

In some embodiments, the semicrystalline multiblock copolymer has a molecular weight of 40 to 1,000 kg/mol (e.g., 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, or 1000 kg/mol), including any and all ranges and subranges therein. For example, in some embodiments, the semicrys-talline multiblock copolymer has a molecular weight of 40 to 500 kg/mol (e.g., 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 417, 418, 419, 420, 421, 422, 423, 424, 425, 426, 427, 428, 429, 430, 431, 432, 433, 434, 435, 436, 437, 438, 439, 440, 441, 442, 443, 444, 445, 446, 447, 448, 449, 450, 451, 452, 453, 454, 455, 456, 457, 458, 459, 460, 461, 462, 463, 464, 465, 466, 467, 468, 469, 470, 471, 472, 473, 474, 475, 476, 477, 478, 479, 480, 481, 482, 483, 484, 485, 486, 487, 488, 489, 490, 491, 492, 493, 494, 495, 496, 497, 498, 499, or 500 kg/mol), including any and all ranges and subranges therein (e.g., 70 to 500 kg/mol, 140 to 500 kg/mol, etc.).

In some embodiments, the inventive semicrystalline multiblock copolymer comprises a block arrangement according to one of formulae (Ia)-(Ig):

| | |
|---|---|
| $iPP_wPE_x$ | (Ia). |
| $iPP_wPE_xiPP_y$ | (Ib) |
| $PE_xiPP_yPE_z$ | (Ic). |
| $iPP_wPE_xiPP_yPE_z$ | (Id). |
| $iPP_wPE_xiPP_yPE_ziPP_{w'}$ | (Ie) |
| $PE_{z'}iPP_wPE_xiPP_yPE_{z'}$ | (If) |
| $iPP_wPE_xiPP_yPE_ziPP_{w'}PE_{z'}$ | (Ig). |

In formulae (Ie) and (Ig), w' is the molecular weight ($M_n$), in kg/mol, of the iPP block preceding it. In formulae (If) and (Ig), z' is the molecular weight ($M_n$), in kg/mol, of the PE block preceding it.

In some embodiments, the inventive semicrystalline multiblock copolymer is a copolymer according to formula (I) or one of formulae (Ia)-(Ig).

In some embodiments of the semicrystalline multiblock copolymer, each of w, x, y, z, w', and z', where present, is independently 10 to 250 kg/mol (e.g., 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, or 250 kg/mol), including any and all ranges and subranges therein (e.g., 15 to 200 kg/mol, 15 to 175 kg/mol, etc.).

In some embodiments, the semicrystalline multiblock copolymer is a diblock copolymer (i.e., consisting of two blocks), a triblock copolymer (i.e., consisting of three blocks), a tetrablock copolymer (i.e., consisting of four blocks), a pentablock copolymer (i.e., consisting of five blocks), or a hexablock copolymer (i.e., consisting of six blocks). In some embodiments, the semicrystalline multiblock copolymer is of a higher order than a hexablock copolymer.

In some embodiments, the semicrystalline multiblock copolymer is a diblock copolymer having a block arrangement according to formula (Ia):

$$iPP_wPE_x \qquad (Ia).$$

In diblock embodiments, the semicrystalline multiblock copolymer has a molecular weight of greater than or equal to 140 kg/mol. As evidenced by the Examples below, it has been found that such embodiments provide for unexpectedly better properties (e.g., in peel strength when used as an adhesive), as compared to lower molecular weight diblock embodiments.

In some embodiments, the inventive semicrystalline multiblock copolymer has a molecular weight of greater than 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, or greater than 250 kg/mol.

In some diblock embodiments, the semicrystalline multiblock copolymer is of formula (Ia), wherein w is greater than 70 kg/mol, and x is greater than 70 kg/mol. In some embodiments, w and x are independently 71 to 250 kg/mol (e.g., 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, or 250 kg/mol), including any and all ranges and subranges therein.

In some embodiments of the inventive semicrystalline multiblock copolymer having a block arrangement according to formula (I), at least one of w, x, y, and z is greater than 100 kg/mol.

In some embodiments, the semicrystalline multiblock copolymer is a triblock copolymer having a block arrangement according to formula (Ib) or formula (Ic):

$$iPP_wPE_xiPP_y \qquad (Ib)$$

$$PE_xiPP_yPE_z \qquad (Ic).$$

In some embodiments, the inventive block copolymer is a triblock copolymer of formula (Ib) or (Ic), wherein for formula (Ib), the sum of w, x, and y is greater than or equal to 70 kg/mol, and for formula (Ic), the sum of x, y, and z is greater than or equal to 70 kg/mol.

In some embodiments where the inventive block copolymer is a triblock copolymer, the triblock copolymer has a molecular weight of at least 71 kg/mol, or at least 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, or 140 kg/mol.

In some embodiments, the semicrystalline multiblock copolymer is a tetrablock copolymer having a block arrangement according to formula (Id):

$$iPP_wPE_xiPP_yPE_z, \qquad (Id).$$

In some embodiments of the semicrystalline tetrablock copolymer according to formula (Id), w, x, y, and z are each independently greater than or equal to 15 kg/mol, or greater than or equal to 20 kg/mol.

In some embodiments of tetrablock copolymers according to formula (Id), the sum of w, x, y, and z is greater than or equal to 100 kg/mol.

In some embodiments, the semicrystalline multiblock copolymer according to the invention has one or more blocks in addition to those of formula (I). For example, in some embodiments, the inventive multiblock copolymer is a pentablock copolymer or a hexablock copolymer.

The polydispersity index, Đ, is used as a measure of the broadness of a molecular weight distribution of a polymer, and is defined as $Đ=M_w/M_n$, where $M_w$ is weight-average molecular weight and $M_n$ is number-average molecular weight. Dispersity (Đ) is a useful measure of the uniformity of polymers. The larger the polydispersity index, the broader the molecular weight. Thus, a monodisperse polymer (such as a protein) has dispersity Đ=1, and highly controlled synthetic polymers have a dispersity Đ~1.

In some embodiments, the semicrystalline multiblock copolymer has a polydispersity index, Đ (where $Đ=M_w/M_n$) of 1.0 to 10 (e.g., 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10.0), including any and all ranges and subranges therein (e.g., 1.0≥Đ≤3.0, 1.0≥Đ≤2.9, 1.1≥Đ≤2.5, 1.0≥Đ≤2.0, etc.).

In some embodiments, the ratio of the total amount of iPP to PE in the semicrystalline multiblock copolymer is 25:75 (iPP/PE) to 75:25 (iPP/PE) (based on $M_n$), including any and all ranges and subranges therein.

In some embodiments, the total amount of iPP in the semicrystalline multiblock copolymer is 25 to 75 wt % (based on $M_n$) (e.g., 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, or 75 wt %), including any and all ranges and subranges therein.

In some embodiments, the total amount of PE in the semicrystalline multiblock copolymer is 25 to 75 wt % (based on $M_n$) (e.g., 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, or 75 wt %), including any and all ranges and subranges therein.

In a second aspect, the invention provides an adhesion layer comprising the semicrystalline multiblock copolymer according to the first aspect of the invention.

In a third aspect, the invention provides a multi-layer film or sheet comprising:
 a first layer comprising polyethylene;
 a second layer comprising polypropylene; and
 an adhesion layer comprising the semicrystalline multiblock copolymer according to the first aspect of the invention,
wherein the adhesion layer is disposed between the first layer and the second layer, and is in direct contact with the first layer and the second layer.

In some embodiments of the multi-layer film or sheet, the polyethylene comprises, or is selected from high density polyethylene (HDPE), linear low-density polyethylene (LLDPE), ultra high molecular weight polyethylene (UHMWPE), low density polyethylene (LDPE), very low density polyethylene (VLDPE), and polyethylene polyolefin block copolymer (e.g., Engage, Affinity, INFUSE).

In some embodiments of the multi-layer film or sheet, the polypropylene in the second layer comprises, or is selected from the group consisting of: isotactic polypropylene (iPP), impact modified polypropylene, polypropylene fibers, and biaxially oriented polypropylene (BOPP).

In a fourth aspect, the invention provides a method of adhering a first layer comprising polyethylene and a second layer comprising polypropylene, the method comprising: contacting the first layer and the second layer with an adhesive composition comprising a semicrystalline multiblock copolymer according to the first aspect of the invention.

In some embodiments, the adhesive composition is provided in the form of a film or sheet.

Persons having ordinary skill in the art are familiar with various techniques for applying the adhesive composition, and any art-acceptable method can be used. In some embodiments, the adhesive composition is applied to the first layer or the second layer by blow molding, electrospinning, melt extruding, injection molding, application through sheer force, or solvent casting (e.g., spin-casting).

In a fifth aspect, the invention provides a blended composition comprising polypropylene, polyethylene, and a semicrystalline multiblock copolymer according to the first aspect of the invention.

In some embodiments, the polypropylene, polyethylene, and semicrystalline multiblock copolymer are present in a mixture having an average droplet diameter of less than 1 µm.

In some embodiments, the blended composition comprises 0.2 to 10 wt % (e.g., 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10.0 wt %) of the semicrystalline multiblock copolymer, including any and all ranges and subranges therein (e.g., 0.2 to 5.0 wt %, 0.2 to 4.5 wt %, etc.).

In some embodiments of the blended composition, the polyethylene comprises, or is selected from high density polyethylene (HDPE), linear low-density polyethylene (LLDPE), ultra high molecular weight polyethylene (UHMWPE), low density polyethylene (LDPE), very low density polyethylene (VLDPE), and polyethylene polyolefin block copolymer (e.g., Engage, Affinity, INFUSE).

In some embodiments of the blended composition, the polypropylene comprises, or is selected from the group consisting of: isotactic polypropylene (iPP), impact modified polypropylene, polypropylene fibers, and biaxially oriented polypropylene (BOPP).

In some embodiments, the ratio of the total amount of polyethylene (PE) to polypropylene (PP) in the blended composition, excluding the block copolymer, is 10:90 (PE/PP) to 90:10 (PE/PP) wt %, including any and all ranges and subranges therein.

In some embodiments, the total amount of PE in the blended composition is 10 to 90 wt % (e.g., 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %), including any and all ranges and subranges therein.

In some embodiments, the total amount of PP in the blended composition is 10 to 90 wt % (e.g., 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %), including any and all ranges and subranges therein.

In a sixth aspect, the invention provides a process for forming the semicrystalline multiblock copolymer according to the first aspect of the invention, said process comprising:
 in a reactor, in a non-polar, non-protic solvent, contacting propylene monomers with a catalyst, thereby forming an iPP block;
 introducing ethylene monomers to the reactor, thereby forming a PE block covalently bonded to the iPP block, thus forming a semicrystalline diblock copolymer; and
 optionally, performing one or more additional steps of introducing to the reactor propylene and/or ethylene monomers, thus forming a semicrystalline multiblock copolymer having additional blocks.

In some embodiments, the catalyst used in the inventive process is a pyridylamidohafnium catalyst, for example, one that corresponds to that described in commonly-owned International Application No. PCT/US2008/003010, filed Mar. 7, 2008, which published as WO/2008/112133 on Sep. 18, 2008.

In some embodiments, the solvent used in the process is selected from toluene, benzene, xylene, hexane, heptane, and methylene chloride. In a particular embodiment, the solvent is toluene.

In some embodiments of the inventive process, the catalyst is the reaction product of a pyridylamidohafnium catalyst precursor and an activator.

In some embodiments, the pyridylamidohafnium catalyst precursor is as defined in PCT/US2008/003010. For example, in some embodiments, the pyridylamidohafnium catalyst precursor is a compound of formula (II)

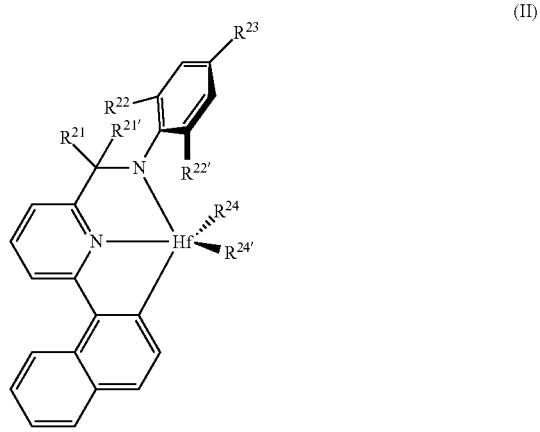

(II)

wherein
$R^{21}$ and $R^{21'}$ are independently selected from H and methyl;
$R^{22}$ and $R^{22'}$ are independently selected from isopropyl and tert-butyl;
$R^{23}$ is selected from H, isopropyl and tert-butyl; and
$R^{24}$ and $R^{24'}$ are independently selected from $C_1$-$C_4$ linear or branched alkyl and benzyl.

In some embodiments, the pyridylamidohafnium catalyst precursor is:

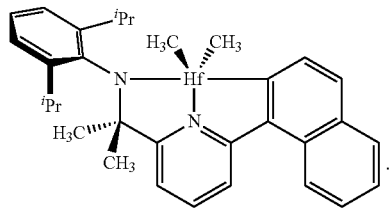

In some embodiments, the activator is selected from methylaluminoxane and $B(C_6F_5)_3$. In particular embodiments, the activator is $B(C_6F_5)_3$.

EXAMPLES

The invention will now be illustrated, but not limited, by reference to the specific embodiments described in the following examples.
Materials and Methods
General Considerations All manipulations of air- and/or water-sensitive compounds were carried out under dry nitrogen using an MBraun Unilab drybox. $^{13}$C NMR spectra of polymers were recorded on a Varian Inova (500, 600 MHz) spectrometer equipped with a $^1$H/BB switchable with Z-pulse field gradient probe referenced versus residual solvent signals. The polymer samples were dissolved in 1,1,2,2-tetrachloroethane-$d_2$ in a 5 mm O.D. tube, and spectra were recorded at 135° C. Molecular weights ($M_n$ and $M_w$) and molecular weight distributions (Đ) were determined by gel permeation chromatography (GPC). Analyses were performed using an Agilent PL-220 equipped with a RI detector. The column set (three Agilent PL-Gel Mixed B columns and one PL-Gel Mixed B guard column) was eluted with 1,2,4-trichlorobenzene containing 0.01 wt % 3,5-di-tert-butyl-4-hydroxytoluene (BHT) at 1.0 mL/min at 150° C. Data were measured relative to a polyethylene calibration curve (Varian and Polymer Standards Service). Peak polymer melting ($T_m$) temperatures and glass transition ($T_g$) temperatures were measured by differential scanning calorimetry (DSC) using a Mettler Polymer DSC calorimeter equipped with an automated sampler. Analyses were performed in aluminum pans under nitrogen and data were collected from the second heating run at a heating rate of 10° C./min from 20 to 180° C. and cooled from 180 to 20° C. at a cooling rate of 10° C./min. Compression molding was carried out using a 4120 Hydraulic Unit Carver press and stainless steel die molds. Mylar and Teflon protective sheets were obtained from Carver and American Durafilm, respectively. Uniaxial tensile elongation was carried out using a Zwick/Roell Z010 testing system equipped with a 10 kN load cell and analyzed using Zwick/Roell TestXpert II v.3.5 software. Melt blends were prepared using a vertical conical counter-rotating twin screw batch compounder with a 2.5 mm diameter extrusion die and 5 g capacity mixing chamber. All polymer processing was carried out on pristine materials (i.e. no BHT, other anti-oxidants, or additives were added). Further experimental details are provided below.

Materials

Toluene was purified over columns of alumina and copper (Q5) prior to use and degassed by bubbling a stream of nitrogen gas through the solvent for 1 hour. Ethylene (Matheson, Matheson purity) and propylene (Airgas, polymer grade) were purified over columns of copper Q5 and 4 Å molecular sieves. $B(C_6F_5)_3$ was obtained from TCI Chemicals and used as received. Pyridylamidohafnium catalyst (1):

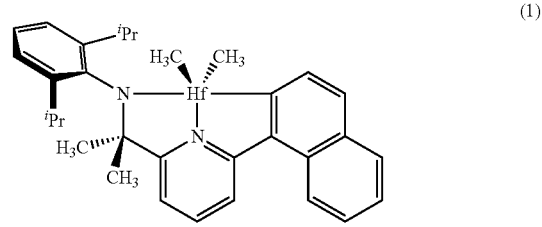

(1)

was prepared according to the procedure set forth in commonly-owned International Application No. PCT/US2008/003010. Diisobutylaluminumphenolate (DIBAP) was prepared by adding BHT (0.220 g, 1.00 mmol, 1.00 equiv.) in toluene (2 mL) to Al($^i$Bu)$_3$ (0.198 g, 1.00 mmol, 1.00 equiv.) in toluene (2 mL) dropwise inside a glovebox and stored in a Teflon cap sealed vial (25). Polypropylene was obtained from Dow Chemical Company (H314-02Z; $M_n$=100 kg/mol; Đ=4.1; $T_m$=163° C.; MFI=2.0 g/10 min at 230° C.

with 2.16 kg). HDPE was obtained from Dow (DMDA8904; $M_n$=22 kg/mol; Đ=3.8; $T_m$=131° C.; MFI=4.4 g/10 min at 190° C. with 2.16 kg). Additional materials tested are shown and described in Table I.

TABLE I

| | $M_n$ (kg/mol) | Đ $M_w/M_n$ | $T_m$ (° C.) | $T_c$ (° C.) | MFI (g/10 min) |
|---|---|---|---|---|---|
| PE Grades | | | | | |
| J-rex HD KF 251A (HDPE) | 14 | 13.8 | 130 | 115 | — |
| DOW DMDA8904 (HDPE) | 22 | 3.8 | 131 | 116 | 4.4 (190° C.) |
| SigmaAldrich (427985) (HDPE) | 15 | 2.2 | 129 | 112 | 12.0 (190° C.) |
| DOW 955I (LDPE) | 17 | 2.6 | 114 | 94 | 35 (190° C.) |
| Exxon LL3003 (LLDPE) | 16 | 6.3 | 126 | 108 | 3.2 (190° C.) |
| iPP Grades | | | | | |
| DOW H314-02Z | 100 | 4.1 | 163 | 117 | 2.0 (230° C.) |
| SigmaAldrich (427861) | 97 | 3.1 | 165 | 109 | 4.0 (230° C.) |

Synthesis of iPP-b-PE Semicrystalline Multiblock Copolymers

General Procedure

In a typical reaction, toluene (150 mL) was loaded into a 12 oz. Fischer-Porter bottle in a nitrogen-filled glove box. To this was added 50 μmol of a 0.25M solution of DIBAP scavenger. In the glovebox, a vial was charged with pyridylamidohafnium catalyst (1) of the appropriate amount indicated in Table II along with $B(C_6F_5)_3$ (1.00 equiv). This co-catalyst mixture was then dissolved in toluene from the Fischer-Porter reactor and transferred via pipette to the Fischer-Porter bottle. The reaction vessel was sealed and removed from the glove box. The vessel weight was tared prior to charging propylene into the vessel to the amount indicated in Table II. The reaction was magnetically stirred for 90 minutes in a water bath at 22° C. to help dissipate heat from the exothermic reaction. The pressure gauge dropped to 0 atm within 20 minutes for all reactions, but was continued to ensure complete consumption of propylene. The reaction mixture became heterogeneous with finely dispersed iPP particles precipitating from the yellow solution. The reactor head was then attached to a quick-connect valve routed to a nitrogen tank and vacuum pump. The vessel was pressurized with nitrogen (1.5 atm) and evacuated under vacuum for 5 seconds before backfilling with nitrogen. This was repeated for a total of three times before allowing the reaction to stir for an additional hour under nitrogen. While under a positive pressure of nitrogen a syringe with 18-gauge stainless steel needle (dried in an oven at 180° C. for 24 h) was used to remove an aliquot of the reaction (~5 mL) and quenched by adding to MeOH (10 mL), filtered, and dried for GPC analysis. The reaction vessel was vented and charged with ethylene at the pressure indicated in Table II. The reaction vessel was stirred under ethylene for the reaction time indicated prior to venting. During this time the block copolymer product began to rapidly precipitate from solution and it is desirable to maintain adequate stirring during the ethylene polymerization for well defined (low Đ) polymers. Mn values increased linearly as a function of monomer conversion. As evidenced by, e.g., entries 1 and 2 in Table II, the molecular weight (MW) of the ethylene block was controlled by varying reaction time under a constant ethylene feed, whereas propylene MWs were tuned by the monomer:catalyst ratio and full conversion. If multiple blocks were prepared, the vessel was evacuated under vacuum and backfilled with nitrogen three times as described before and stirred for 60 minutes prior to introducing the next monomer. Upon completion of the reaction, the vessel was vented and acidic MeOH (5% HCl, 10 mL) was injected. The heterogeneous mixture was then poured into acidic MeOH (300 mL), stirred for at least 3 hours, vacuum filtered, and dried under vacuum at 60° C. All samples prepared in Table II were synthesized using this procedure. In Table II, "PP" represents iPP. Molecular weights ($M_n$) and dispersities (Đ=$M_w/M_n$) were determined using size-exclusion chromatography calibrated with polyethylene standards.

TABLE II

Properties of Semicrystalline PE/iPP Block Copolymers.

| Entry | Product ($PP_{kDa}PE_{kDa}$) | Cat. (μmol) | $C_3H_6$ (g) | $P_{ethylene}$ (atm) | $t_{rxn}C_2H_4$ (min) | Yield (g) | $M_n$ (theo.) (kg/mol) | $M_n$ (tot.) (kg/mol) | Đ ($M_w/M_n$) | $T_m$ (° C.) |
|---|---|---|---|---|---|---|---|---|---|---|
| 1 | $PP_{71}PE_{137}$ | 30 | 2.3 | 2.7 | 10 | 6.2 | 207 | 208 | 1.29 | 133 |
| 2 | $PP_{73}PE_{50}$ | 30 | 2.3 | 2.7 | 5 | 3.9 | 130 | 123 | 1.29 | 131 |
| 3 | $PP_{24}PE_{31}$ | 75 | 1.5 | 2.0 | 3 | 3.3 | 44 | 55 | 1.32 | 132 |
| 4 | $PP_{36}PE_{20}PP_{34}PE_{24}$ | 25 | 1.0, 1.0 | 1.4, 1.4 | 4, 4 | 3.0 | 120 | 113 | 1.38 | 124 |
| 5 | $PP_{60}PE_{80}PP_{75}PE_{90}$ | 30 | 2.0, 2.0 | 2.7, 2.7 | 4, 4 | 8.5 | 283 | 306 | 1.29 | 126 |

Cat., catalyst; $P_{ethylene}$, pressure of ethylene; $t_{rxn}$, reaction time; $M_n$, number-average molecular weight; theo., theoretical; tot., total; $M_w$, weight-average molecular weight; Đ, dispersity; $T_m$, melting temperature.

Scheme 1 presents a simple schematic for the general synthesis described above used to make the examples listed in Table II.

SCHEME 1

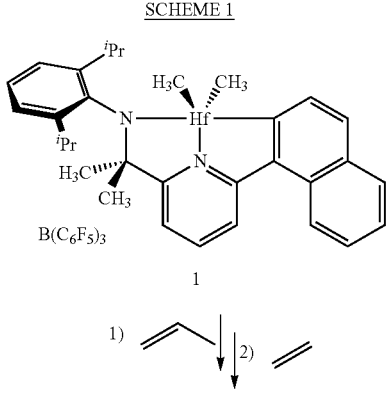

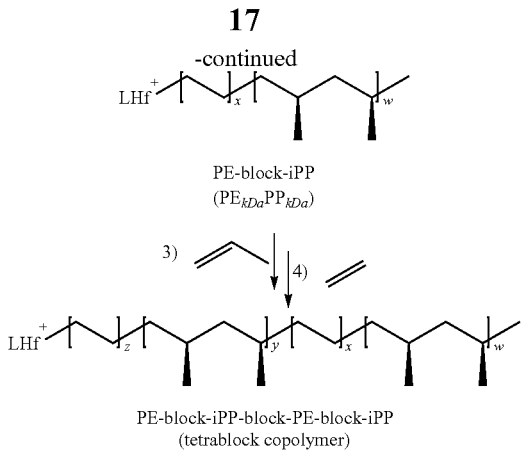

PE-block-iPP
($PE_{kDa}PP_{kDa}$)

PE-block-iPP-block-PE-block-iPP
(tetrablock copolymer)

Alternative, Simplified Procedure without Vacuum Pump

A large scale polymerization was carried out in similar ratios to entry 1, Table II, above, but without the use of vacuum/nitrogen backfilling. Toluene (300 mL) was added to a 24 oz. Fischer-Porter bottle in a nitrogen-filled glove box. DIBAP scavenger (75 µmol of 0.25M solution) was added. In a separate pyridylamidohafnium catalyst 1 (32 mg, 50 µmol) and B($C_6F_5$)$_3$ (26 mg, 50 µmol, 1.00 equiv.) were weighed together and subsequently dissolved by adding the toluene/DIBAP mixture to the vial, before transferring to the Fischer-Porter bottle. The reaction vessel was sealed and charged with propylene gas (5.0 g) and stirred for 3h at room temperature in a 22° C. water bath. Approximately 5 mL of the reaction mixture was removed using a syringe equipped with an 18-gauge needle and quenched by adding to MeOH (10 mL). The reaction vessel was then charged with ethylene gas (2.7 atm) and rapidly stirred for 10 minutes. After this time, the reaction vessel was vented and quenched with the addition of acidic MeOH (5% HCl, 10 mL), precipitated into acidic MeOH (300 mL), stirred for 3 hours, vacuum filtered, washed with MeOH (~100 mL) and dried under vacuum at 60° C. overnight. The resulting polymer (8.3 g, $PP_{77}PE_{138}$) had a $T_m$ of 128° C., $M_n$ (theo.) of 166 kg/mol, $M_n$ (tot.) of 215 kg/mol, and Đ=1.4. This alternative procedure may be more amenable to certain laboratory setups.

Figure 1B:
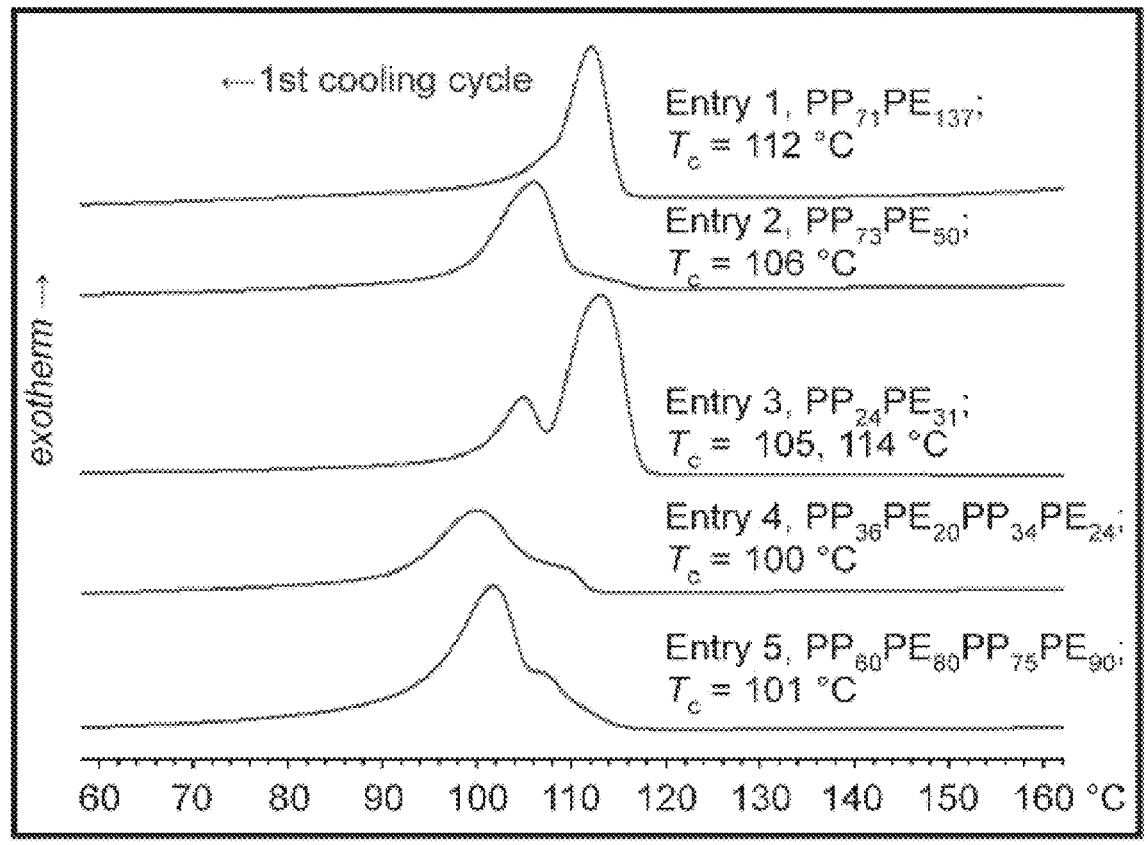

FIGS. 1A and 1B are DSC curves showing melting temperatures and crystallization temperatures, respectively, for the multiblock copolymers of Table II. Measurements were conducted between 20 and 180° C. at 10° C./min. Melting temperatures ($T_m$) were calculated according to the peak endotherm on the second heating cycle (FIG. 1A). Crystallization temperatures ($T_c$) were calculated according to the peak exotherms of the first cooling cycle (FIG. 1B).

The single melting endotherms observed (FIG. 1A) are due to regio- and stereoerrors in the propylene block, which lower the $T_m$ of the iPP homopolymers to 134° C. (vs. ~165° C. for perfect iPP) which is very similar to the $T_m$ of the PE block (135° C.). This was confirmed by quantitative $^{13}C$ NMR spectroscopy, which showed high stereoselectivity for 1,2-insertion of polypropylene ($m^4$=91%), regio-errors previously observed with this class of catalysts were also detected. Importantly, the NMR spectra showed neither detectable vinylidene end-groups, which would arise from β-hydride elimination, nor peaks consistent with random ethylene-co-propylene segments; this confirms there is minimal tapering in the materials. Consistent with this reactivity, catalyst 1/B($C_6F_5$)$_3$ was capable of synthesizing PE/iPP tetrablock copolymers (entries 4 and 5 in Table II). GPC analysis of aliquots taken after complete consumption of the monomers showed that molecular weights increased after each monomer addition and molar mass dispersities remained low (FIGS. 2A-E), although some molecular weight broadening was observed due to precipitation of the insoluble, semicrystalline polymer. FIGS. 2A-E are charts showing GPC analysis of aliquots and final PE/iPP block copolymer products presented in Table II. Molecular weights and molecular weight distributions (Đ) were analyzed using an Agilent PL-220 equipped with a RI detector and three Agilent PL-Gel Mixed B columns and one PL-Gel Mixed B guard column. Samples were eluted with 1,2,4-trichlorobenzene at 1.0 mL/min at 150° C. and measured relative to a polyethylene calibration curve.

Adhesion Studies

Owing to thermodynamic incompatibility, weak van der Waals interactions, and the accumulation of amorphous polymer at the junction between melt molded laminates, most commercial grades of iPP and PE homopolymers display poor interfacial adhesion.

Preparation of iPP and PE Films

Polymer pellets of Dow iPP (H314-02Z) or Dow HDPE (DMDA8904) were pressed in a Carver press between Mylar sheets at 180° C. for 5 minutes with minimal pressure to create a coherent film which was subsequently trimmed to approximately 6 cm×10 cm and compression molded in a 6 cm×10 cm×0.34 mm stainless steel die at 180° C. for 5 minutes under 70 atm of pressure and cooled with water circulation (~10° C./min). The film surfaces were subsequently wiped with a Kim-wipe soaked with $CHCl_3$ and air dried for 24 h.

Preparation of iPP-b-PE Adhesive

Block copolymer powder was pressed in a Carver press between protective sheets (either Mylar or Teflon) at 180° C. for 5 minutes with minimal pressure to create a coherent film. The film was trimmed to ~3 cm×~10 cm and compression molded without a die at 180° C. for 5 minutes under 550 atm of force and cooled with water circulation. The film was measured by calipers to be between 95 and 115 µm thick and trimmed to 3 cm×10 cm. The film surfaces were subsequently wiped with a Kim-wipe soaked with $CHCl_3$ and air dried for 24 h.

Preparation of Laminate

HDPE film was placed in a 6 cm×10 cm×1 mm stainless steel die and the iPP-b-PE adhesive strip was placed carefully over the bottom half of the HDPE sheet. The iPP sheet was placed on top of the two, thereby sandwiching the block copolymer film between the PE and iPP. The trilayer was pressed at 180° C. for 5 minutes under 70 atm of pressure before cooling with water circulation (~10° C./min). Once at room temperature, the laminate was removed from the die and aged for 48 hours. A crack was started at the interface of the top half, which contained no block copolymer adhesive. The 6 cm×10 cm laminate was then trimmed into 6-14 individual 0.6 cm×6 cm rectangular adhesive samples for testing.

T-Peel Testing

A simple peel test was used to evaluate adhesion between heterogeneous grade PE and iPP laminates with and without the presence of embodiments of multiblock copolymers as an adhesive layer. Rectangular plaques of bilayer (PE/iPP) and trilayer (with block copolymer film), after being compression molded in the melt, were pulled apart while monitoring the peel strength (S, force/sample width). This test provides a facile method for comparing the interfacial strength between the molded films.

Figure 3A:
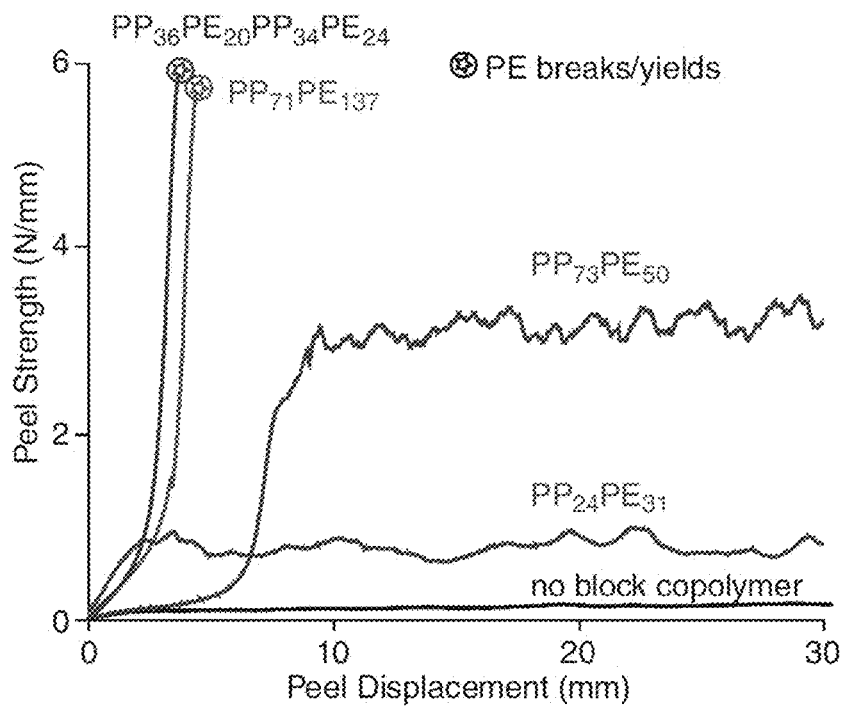
FIG. 3A shows representative peel test results obtained as a function of block copolymer molecular architecture and molecular weight.

FIG. 3A shows representative peel test results obtained as a function of block copolymer molecular architecture and molecular weight. Results obtained from 100 μm thick block copolymer films are shown, but it is noted that no thickness dependence was observed down to 5 μm solvent cast films (see FIGS. 8A-D).

Figure 8:
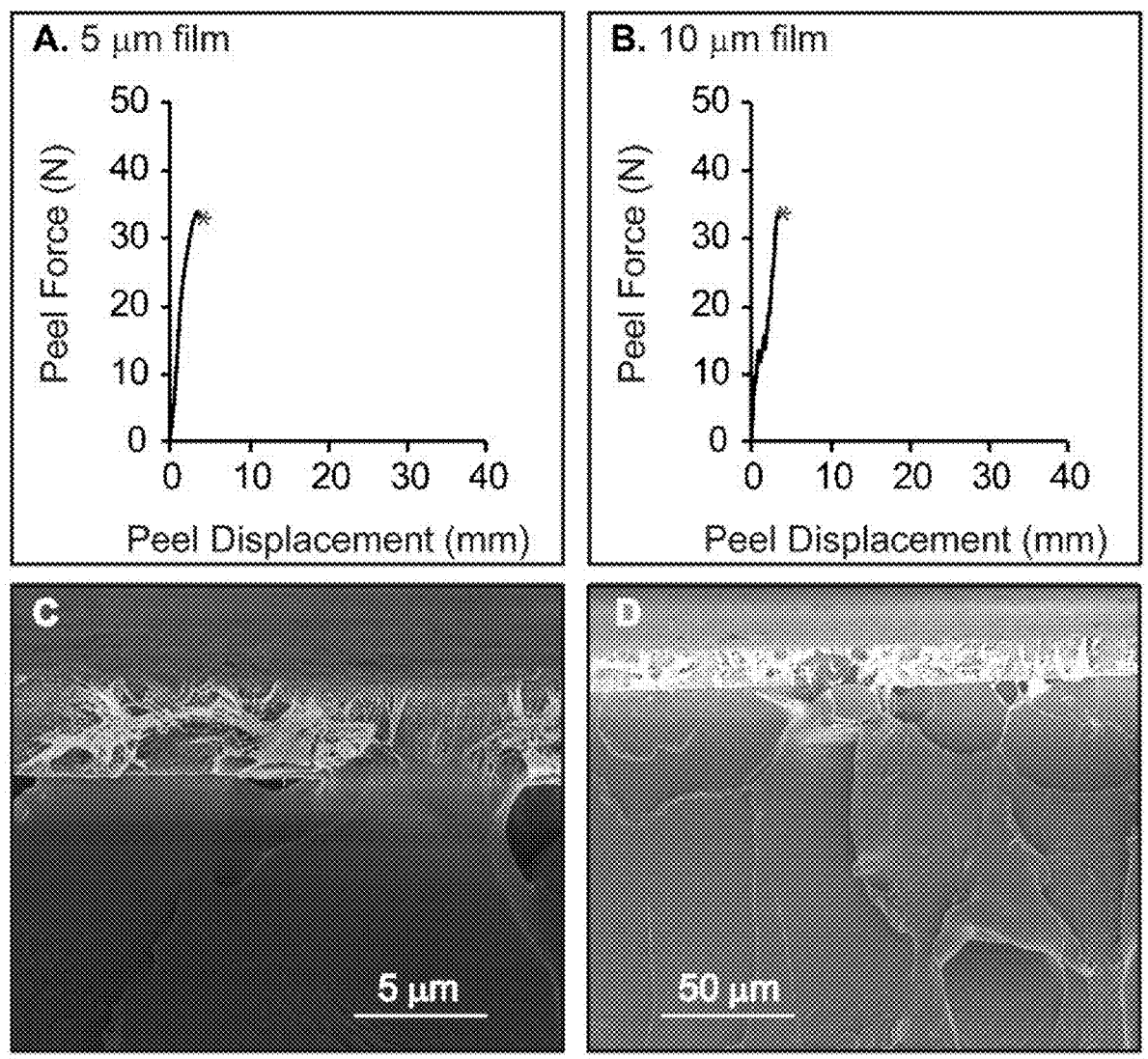
FIGS. 8A-D depict peel force results for laminates different thickness diblock copolymer films, and corresponding SEM images.
Figure 9:
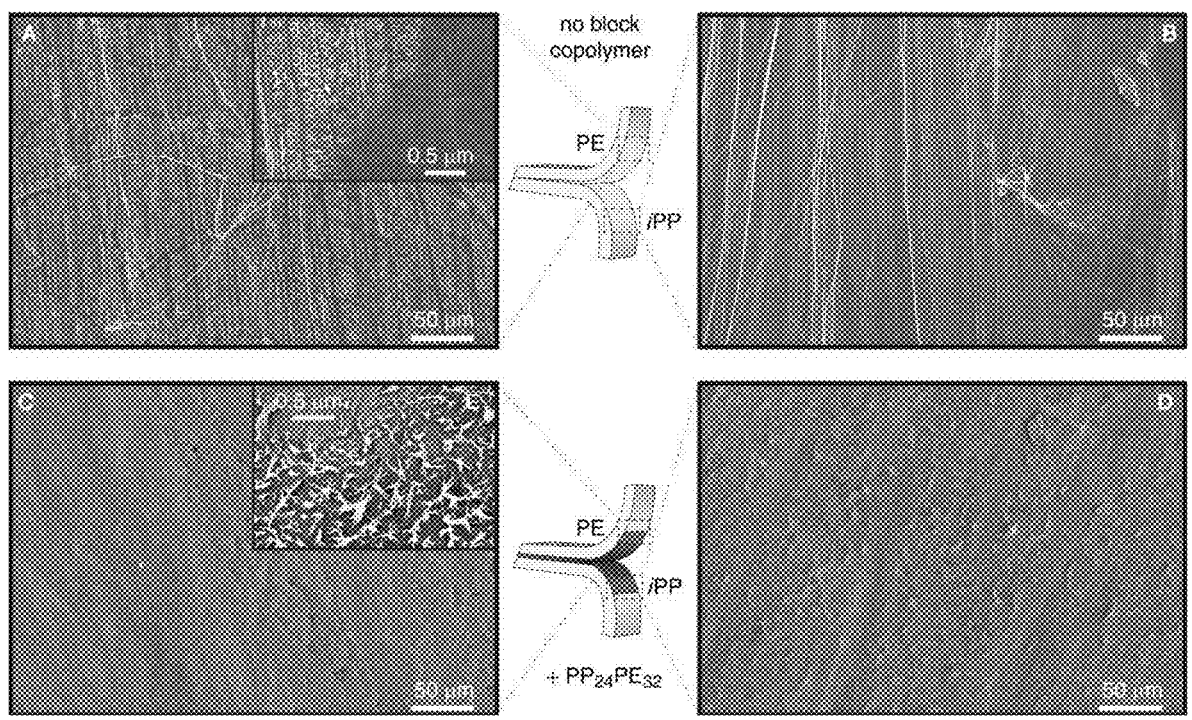
FIGS. 9A-D are SEM images of embodiments of laminates.

FIG. 8 shows: (8A) Peel force of PE/iPP laminates which contain a 5 μm thick film of high molecular weight diblock copolymer ($PP_{77}PE_{138}$), measured by (8C) SEM. (8B) Peel force of PE/iPP laminates which contain a 10 m thick film of high molecular weight diblock copolymer ($PP_{77}PE_{138}$), measured by (8D) SEM. 5 m thick block copolymer films (8C) were prepared by dissolving 0.5 wt % $PP_{77}PE_{138}$ diblock copolymer in xylenes at 100° C. and then the hot solution (0.24 g) was transferred to a sheet of Dow iPP (H314-02Z) with an area of 6 cm×4 cm and solvent evaporated. 10 μm thick block copolymer films (8D) were prepared by the same procedure using a 1 wt % $PP_{77}PE_{138}$ solution in xylenes. SEM images (8C and 8D) where cryofractured in liquid nitrogen at various spots to verify the uniformity and thickness of the block copolymer layers; at least two sheets were used for each thickness.

Returning to FIG. 3A, rectangular sheets (0.6 cm by 6 cm, 340 μm thick) of PE/iPP were laminated in the melt at 180° C. with and without PE/iPP block copolymer layers (100 m thick) and pulled apart at 10 mm/min. Stars indicate that PE films break or deform rather than undergo delamination. Specimens were investigated with SEM imaging after testing (FIGS. 9A-D).

FIGS. 9A-D are SEM images of laminates after testing showing the smooth surface of the (9A) PE film and (9B) iPP film, consistent with low adhesive force, no block copolymer adhesive, and little polymer chain deformation. (9C) shows the surface of the PE film after testing with a low molecular weight ($PP_{24}PE_{32}$) diblock copolymer while (9D) shows the iPP film. The zoomed inset of (9C) suggests samples containing a block copolymer layer have deformed (stretched) in agreement with the moderate peel strength required to stretch the polymer chains. It is unclear from these studies if the deformed material is block copolymer or bulk polyolefin film.

Figures 3B, 3C, 3D:
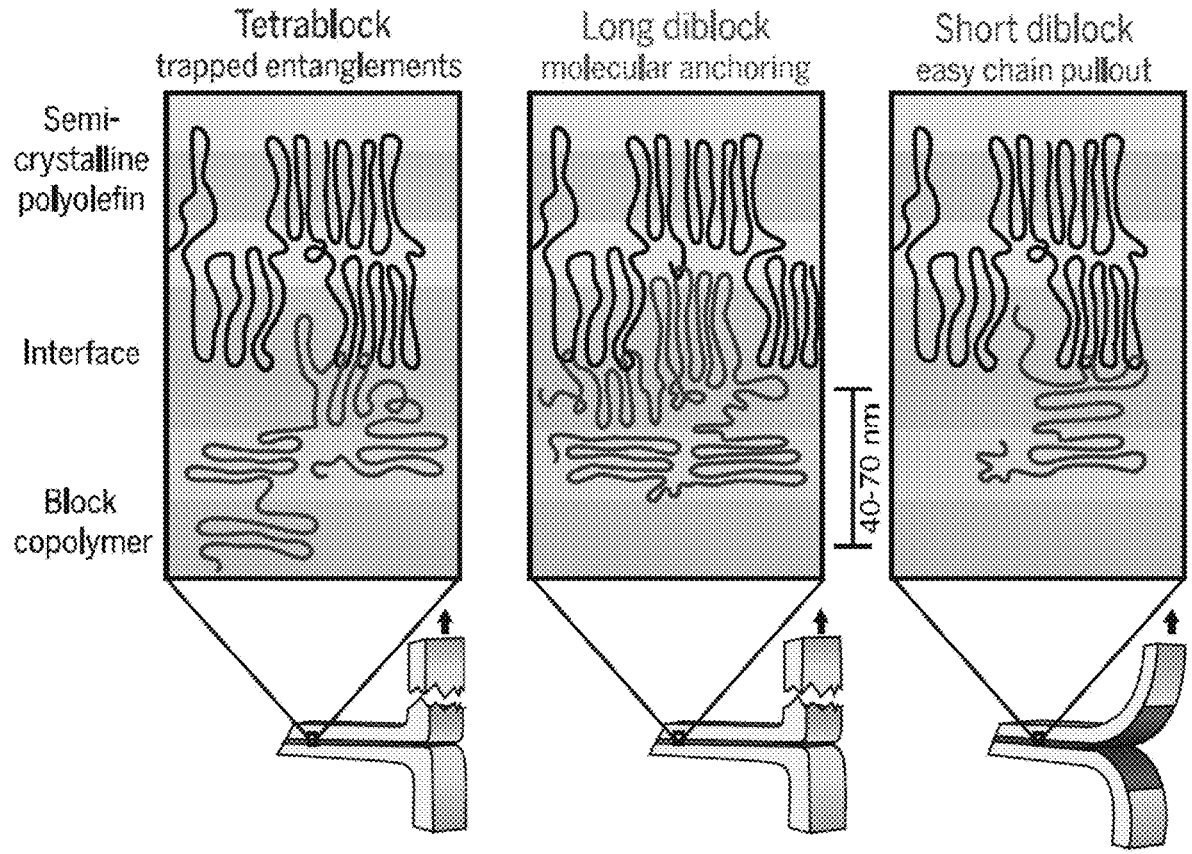
FIGS. 3B-D depict proposed models to explain the adhesive difference between embodiments of (B) tetrablock, (C) high-$M_n$ diblock, and (D) low-$M_n$ diblock copolymers.
Figure 4A:
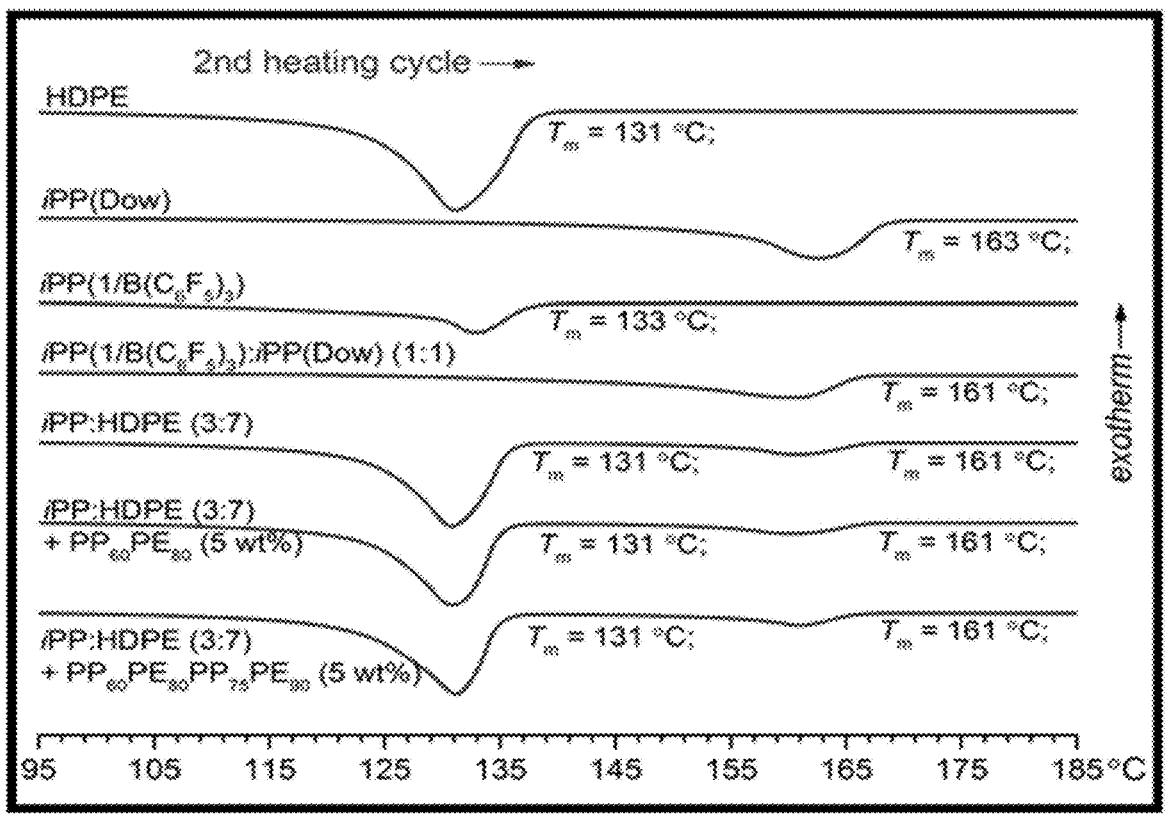
FIGS. 4A-B provide DSC curves of PE/iPP multiblock copolymer embodiments and blends.
Figure 4B:
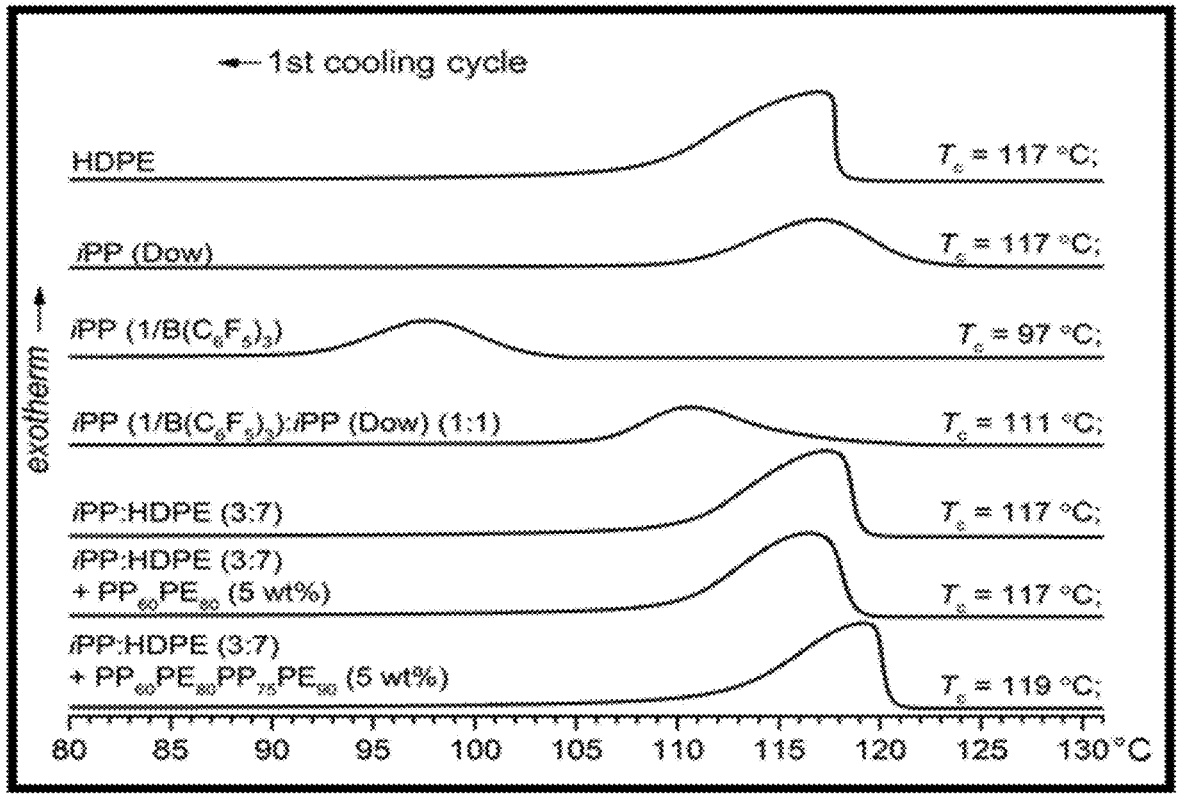
Figure 5:
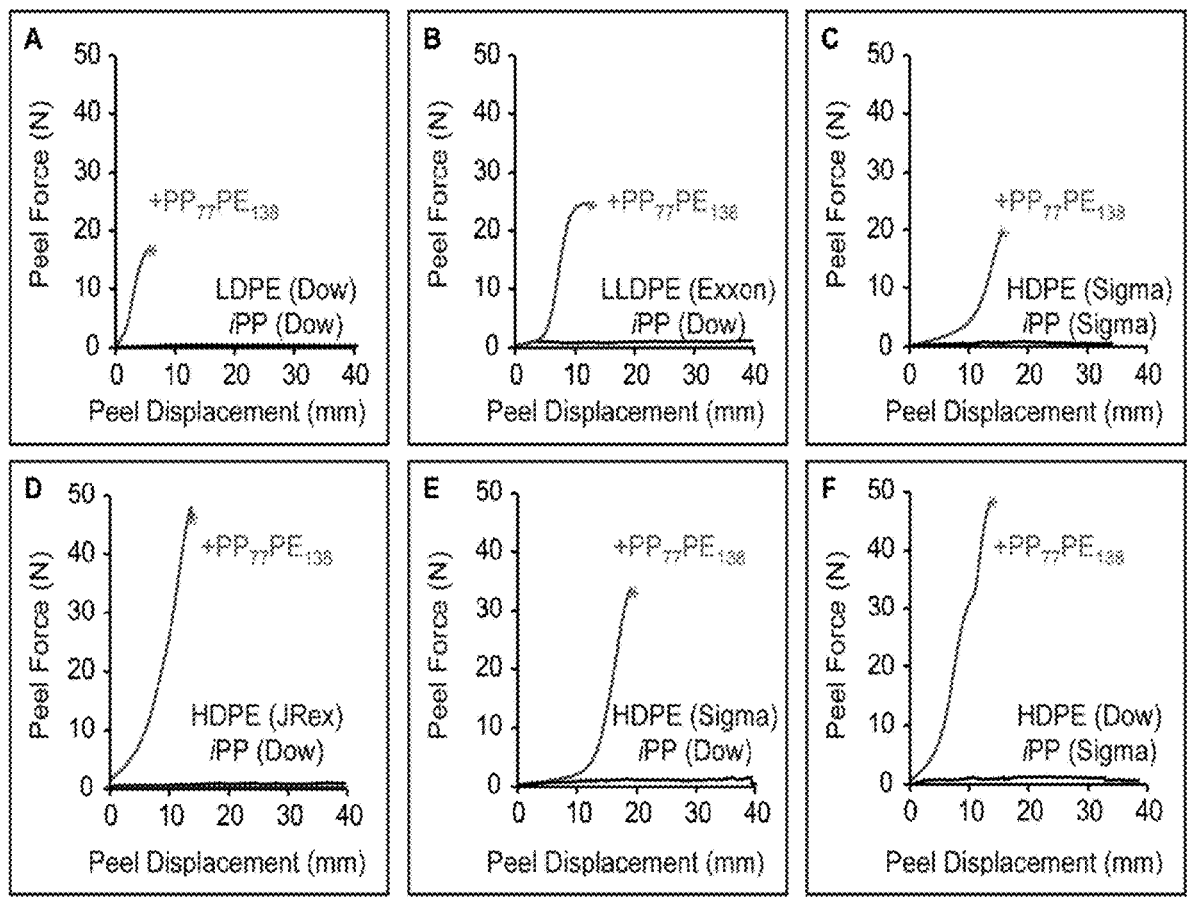
FIGS. 5A-F depict charts showing peel strength between different combinations of commercial PE and iPP bulk films with and without an embodiment of high molecular weight block copolymer adhesive ($iPP_{77}PE_{138}$).
Figure 10:
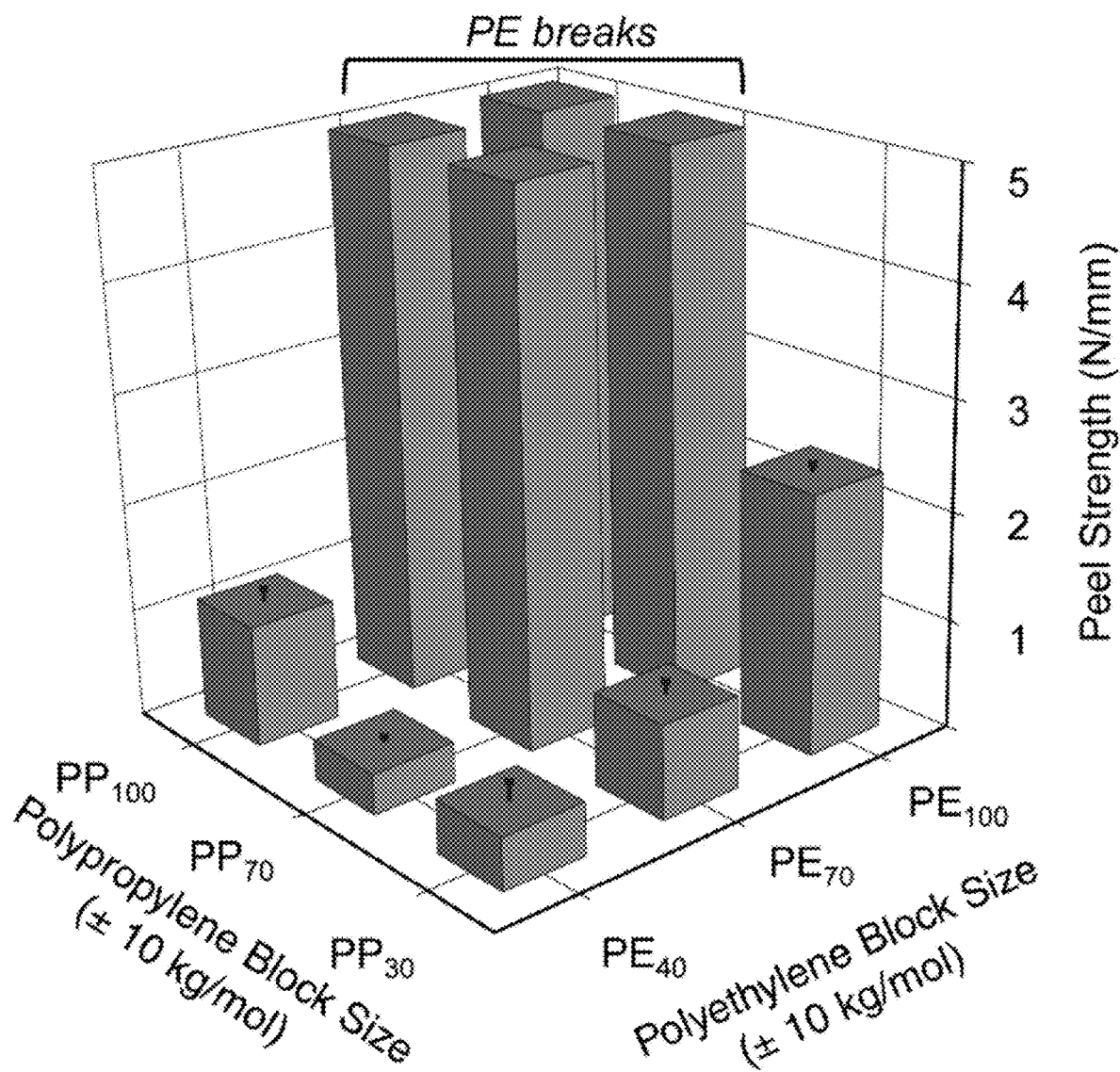
FIG. 10 is a chart showing the effect of polypropylene and polyethylene block sizes (±10 kg/mol) of diblock copolymer films (~100 μm thick) on PE/iPP laminate peel strength. Laminates were prepared as described herein with Dow iPP (H314-02Z) and Dow HDPE (DMDA8904) and the block copolymers detailed below. Values are the mean of 6 samples and error bars reflect±1 standard deviation.

Returning to FIG. 3, laminates without block copolymer peel apart easily, (S<0.5 N/mm). Incorporation of the semicrystalline $iPP_{24}PE_{31}$ and $iPP_{73}PE_{50}$ diblock copolymers increases the peel strength to S≈1 N/mm and S≈3 N/mm, respectively. Increasing the molecular weight of both blocks beyond a threshold value leads to a dramatic change in the failure mechanism from adhesive failure (low molecular weights) to cohesive failure (fracture, S>6 N/mm) of the PE homopolymer film above about 75 kg/mol as shown in FIG. 3A (see also, FIG. 10 and FIGS. 11A-R). The interfacial strength between the diblock and homopolymer films is dependent on the block sizes due to two factors. The block copolymer acts as a surfactant, eliminating the thermodynamic driving force for amorphous materials to localize at the interface between block copolymer and iPP and PE film junctions. In some respects, the block copolymer acts as a type of macromolecular welding flux material. Secondly, increasing the overall block size enhances interpenetration and the number of entanglements between the chemically identical blocks and homopolymers chains in the melt state. Moreover, we anticipate a threshold molecular weight beyond which the polymer block will be able to bridge the amorphous layers associated with the lamellar morphology of semicrystalline polymers such as iPP and PE leading to co-crystallization along the film interfaces as shown in FIG. 3C and FIGS. 4A-B, which provide DSC curves of PE/iPP multiblock copolymers and blends from Table II. As can be seen from FIGS. 4A and 4B, iPP homopolymer produced by catalysts $1/B(C_6F_5)_3$ and as a blend (1:1) with commercial iPP showing a single melting Materials were melt blended at 190° C. without endotherm and crystallization exotherm indicating regio and stereo defects of the iPP block are not numerous enough to inhibit cocrystallization. Measurements were conducted between 20 and 180° C. at 10° C./min. Melting temperatures ($T_m$) were calculated according to the peak endotherm on the second heating cycle (FIG. 4A). Crystallization temperatures ($T_c$) were calculated according to the peak exotherms on the first cooling cycle (FIG. 4B).

Without being bound by theory, FIGS. 3B-D depict proposed models to explain the adhesive difference between embodiments of (B) tetrablock, (C) high-$M_n$ diblock, and (D) low-$M_n$ diblock copolymers. Block copolymers are in multiple lamellae (40-70 nm); the first layer is shown. Lower molecular weight diblocks are less capable of reaching the homopolymers crystalline lamellae (see FIG. 3D) and are prone to chain pull-out, resulting in lower adhesive strength. The welding effect was observed in various polyolefin materials (see FIGS. 5A-F) and only with semi-crystalline block polymer adhesives (see FIGS. 6 A-C).

FIGS. 5A-F depict charts showing peel strength between different combinations of commercial PE and iPP bulk films with and without high molecular weight block copolymer adhesive ($iPP_{77}PE_{138}$). Films were prepared according the above procedure. In all samples the PE bulk film, regardless of PE density, yielded or broke demonstrating the adhesion strength of the interface surpassed the bulk tear strength in all samples (≥6).

Figure 6:
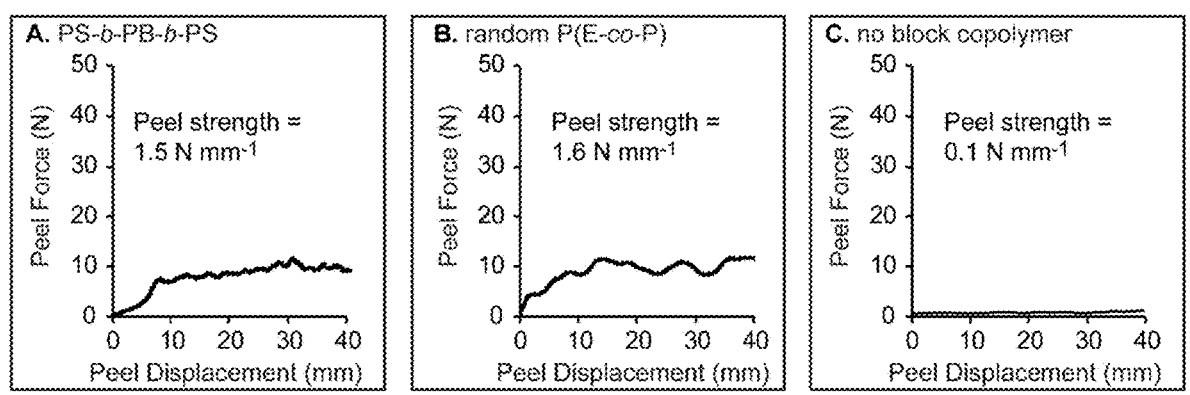
FIGS. 6A-C depict charts showing peel force of PE/iPP laminates with (6A) styrene/butadiene elastomer (polystyrene-block-polybutadiene-block-polystyrene, styrene 30 wt. %) obtained from Sigma-Aldrich (#432490), (6B) amorphous high molecular weight ethylene propylene random copolymer prepared using $1/B(C_6F_5)_3$ ($M_n$=314,900; Đ=1.29; E:P 3:2), and (6C) no adhesive layer in place of the iPP-b-PE block copolymers.

FIGS. 6 A-C depict charts showing peel force of PE/iPP laminates with (6A) styrene/butadiene elastomer (polystyrene-block-polybutadiene-block-polystyrene, styrene 30 wt. %) obtained from Sigma-Aldrich (#432490), (6B) amorphous high molecular weight ethylene propylene random copolymer prepared using $1/B(C_6F_5)_3$ ($M_n$=314,900; Đ=1.29; E:P 3:2), and (6C) no adhesive layer in place of the iPP-b-PE block copolymers. PE/iPP films were Dow iPP (H314-02Z) and Dow HDPE (DMDA8904).

Returning to FIG. 3, the $PP_{36}PE_{20}PP_{34}PE_{24}$ tetrablock copolymer also exhibits extraordinary adhesive strength evidenced by cohesive failure (FIG. 3B), seemingly contradicting the above molecular weight findings for diblock copolymers, as all the blocks are well below the threshold molecular weight for cohesive failure with diblocks. We invoke a different mechanism for this result. A tetrablock molecular architecture ensures that half the iPP and PE blocks are flanked by the thermodynamically incompatible counterparts. This implies that interfacial mixing during melt compression produces entangled loops that effectively stitch together the homopolymers and block copolymer films upon crystallization when the laminates are cooled as illustrated in FIG. 3B. Similar arguments account for the enhanced toughness of bulk multiblock versus triblock polymers. Consistent with this line of reasoning, the $PP_{36}PE_{20}PP_{34}PE_{24}$ tetrablock copolymer is microphase separated up to 260° C. as shown by rheological measurements (see FIGS. 7A-B).

Figure 7A:
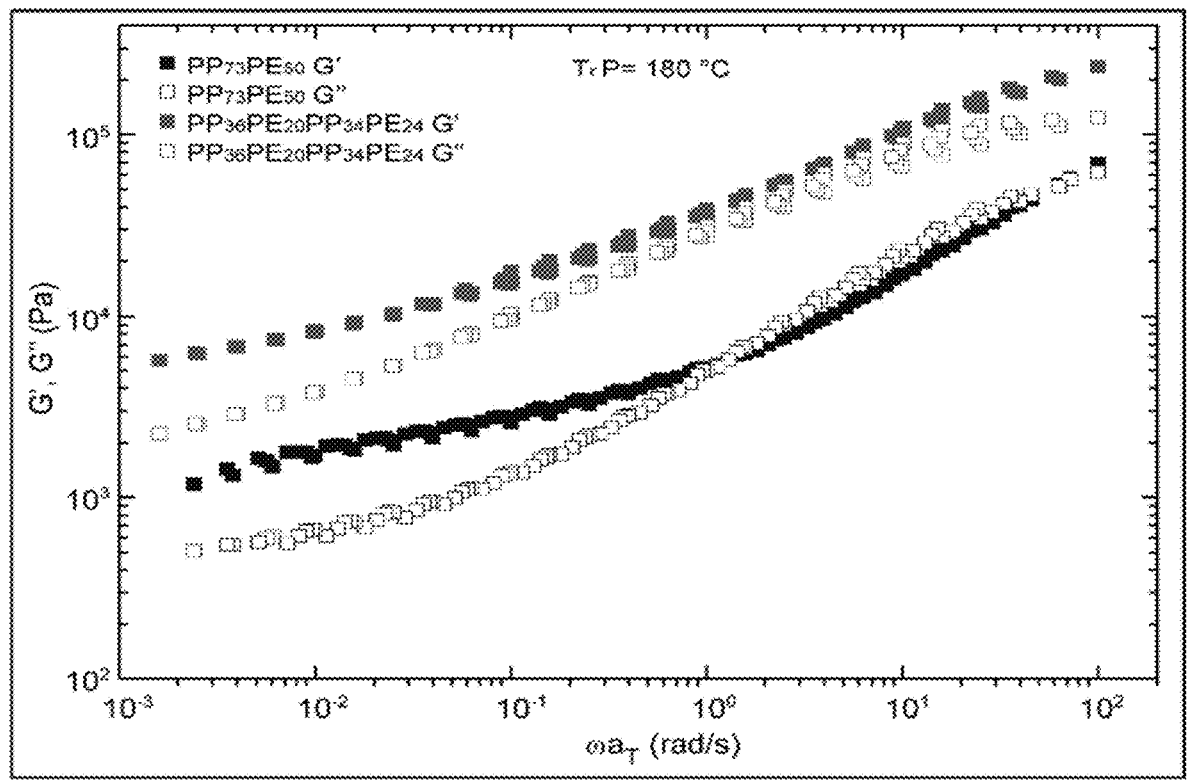
FIG. 7A provides linear dynamic mechanical spectroscopy measurements of embodiments of diblock and tetrablock copolymers.
Figure 7B:
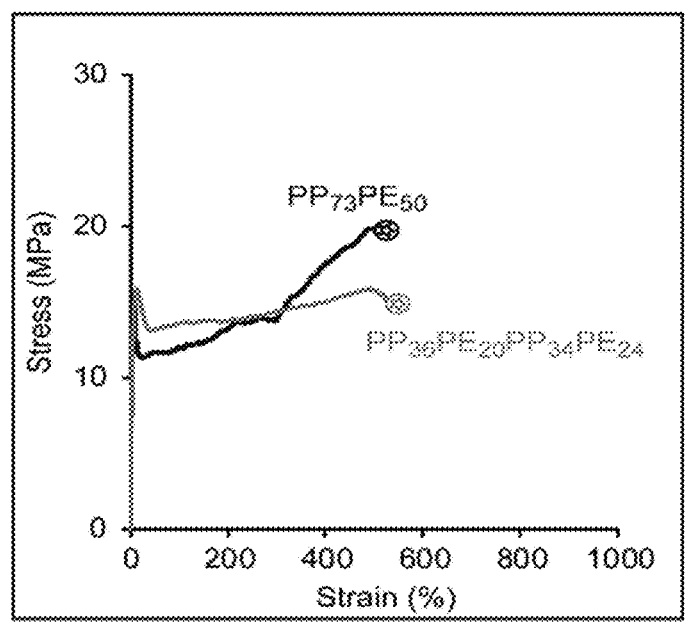
FIG. 7B provides uniaxial tensile elongation of embodiments of bulk diblock and tetrablock copolymers.

FIG. 7A provides linear dynamic mechanical spectroscopy measurements of diblock ($iPP_{73}PE_{50}$) and tetrablock ($iPP_{36}PE_{20}iPP_{34}PE_{24}$) copolymers used in FIG. 3A demonstrating that these materials are microphase separated over the range of temperatures employed in this work. Rheology experiments were carried out on an ARES rheometer with a 25-mm parallel plate geometry and a gap of 0.8 mm. Data were collected at individual temperatures between 180° C. to 260° C. over a frequency range of 0.01 to 100 rad/s. The master curves were obtained by shifting the isothermal frequency data along the frequency axis by $a_T$. The low frequency responses G'~$\omega^a$ and G"~$\omega^b$, where a<1 and b<1, are indicative of an ordered state. FIG. 7B provides uniaxial tensile elongation of bulk diblock (iPP$_{73}$PE$_{50}$) and tetrablock (iPP$_{36}$PE$_{20}$iPP$_{34}$PE$_{24}$) materials showing similar ductile mechanical responses. Block copolymers were compression molded at 180° C. to form a 0.2 mm thin film then cooled with water circulation. Tensile samples were punched into dogbone shaped samples with a gauge width of 3 mm and gauge length of 10 mm. At least 5 tensile tests were conducted at room temperature with an extension rate of 5 mm/min using a Shimadzu AGX tensile tester.

Melt Blend Studies

Challenges of recycling mixed polyolefin municipal waste (typically 70:30 PE:iPP) are in part due to interfacial phase separation leading to poor mechanical properties. Since specialty grades of PE and iPP can be blended to improve impact and crack resistance, the effective compatibilization of heterogeneous grade polyolefins may allow an upcycling of plastic wastes into higher value materials.

Blend Preparation

Polymer pellets of Dow iPP (H314-02Z, 1.2 g) and Dow HDPE (DMDA8904, 2.8 g), and block copolymer powder (200 mg or 40 mg) were combined and pressed at 180° C. for 5 minutes with minimal pressure to create a coherent film. The film was fed into a twin-screw microcompounder at 190° C. with a steady flow of nitrogen and residence time of 8 minutes at 130 rpm. The material was then extruded through a 2.5 mm diameter die and air cooled. The resulting blend was then pressed at 180° C. for 5 minutes with minimal pressure to create a coherent film.

Sample Preparation

Blend films were loaded into a stainless steel dogbone die (gauge length=16 mm, gauge width=3 mm, gauge thickness=0.6 mm) and pressed on a Carver press hot plate under ~52 MPa at 180° C. for 5 minutes. Maintaining this pressure, the sample was cooled using water circulation (~10° C./min). The samples were removed and trimmed with a razor blade.

Mechanical Testing

Figure 12:
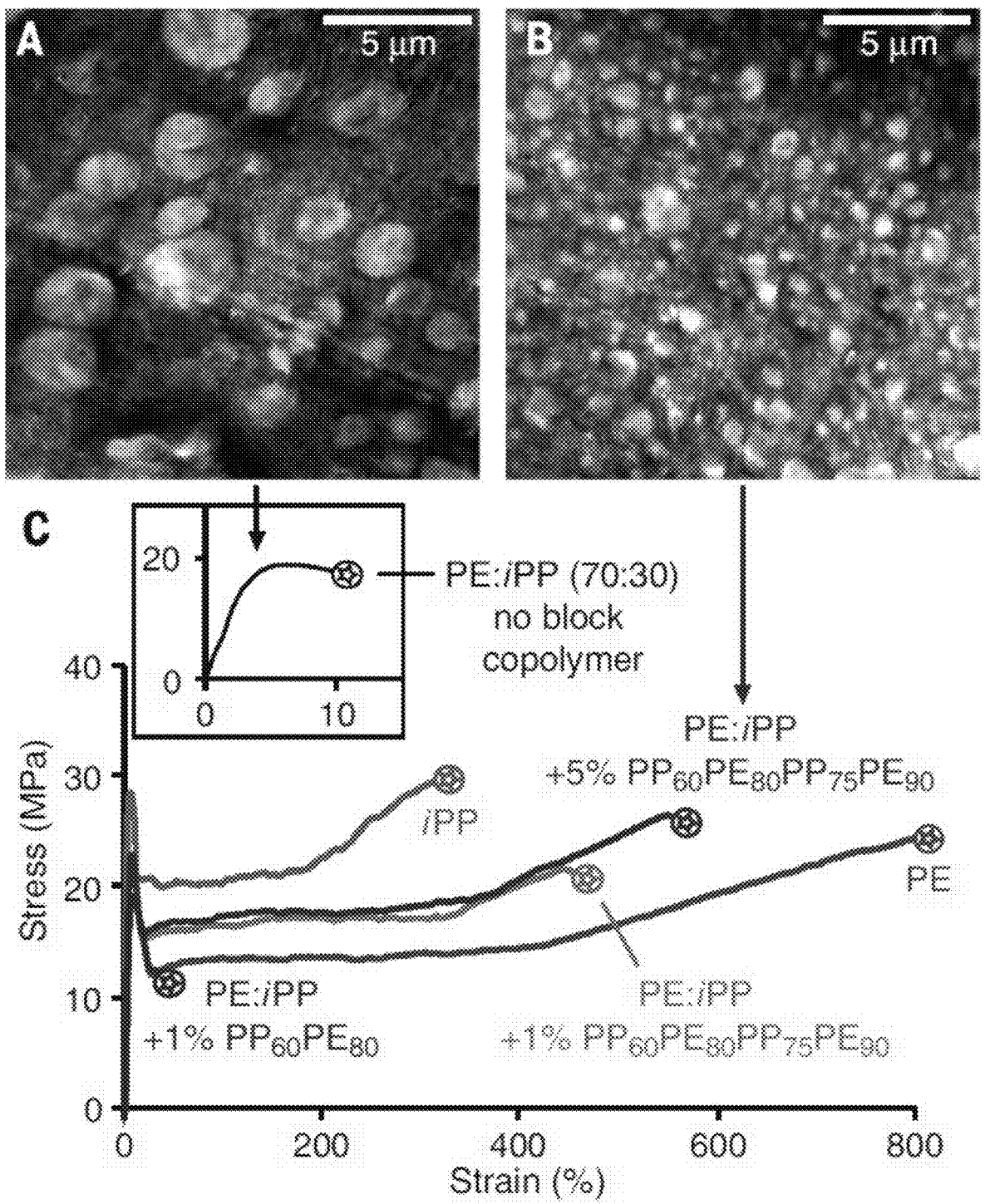
FIGS. 12A-C show: TEM images of the morphology obtained from a heterogeneous grade polyolefin blend containing 70 wt % PE and 30 wt % iPP; consequences of adding 5 wt % of tetrablock $PP_{60}PE_{80}PP_{75}PE_{90}$ to this mixture; ductility and strain testing results, respectively.
Figure 13:
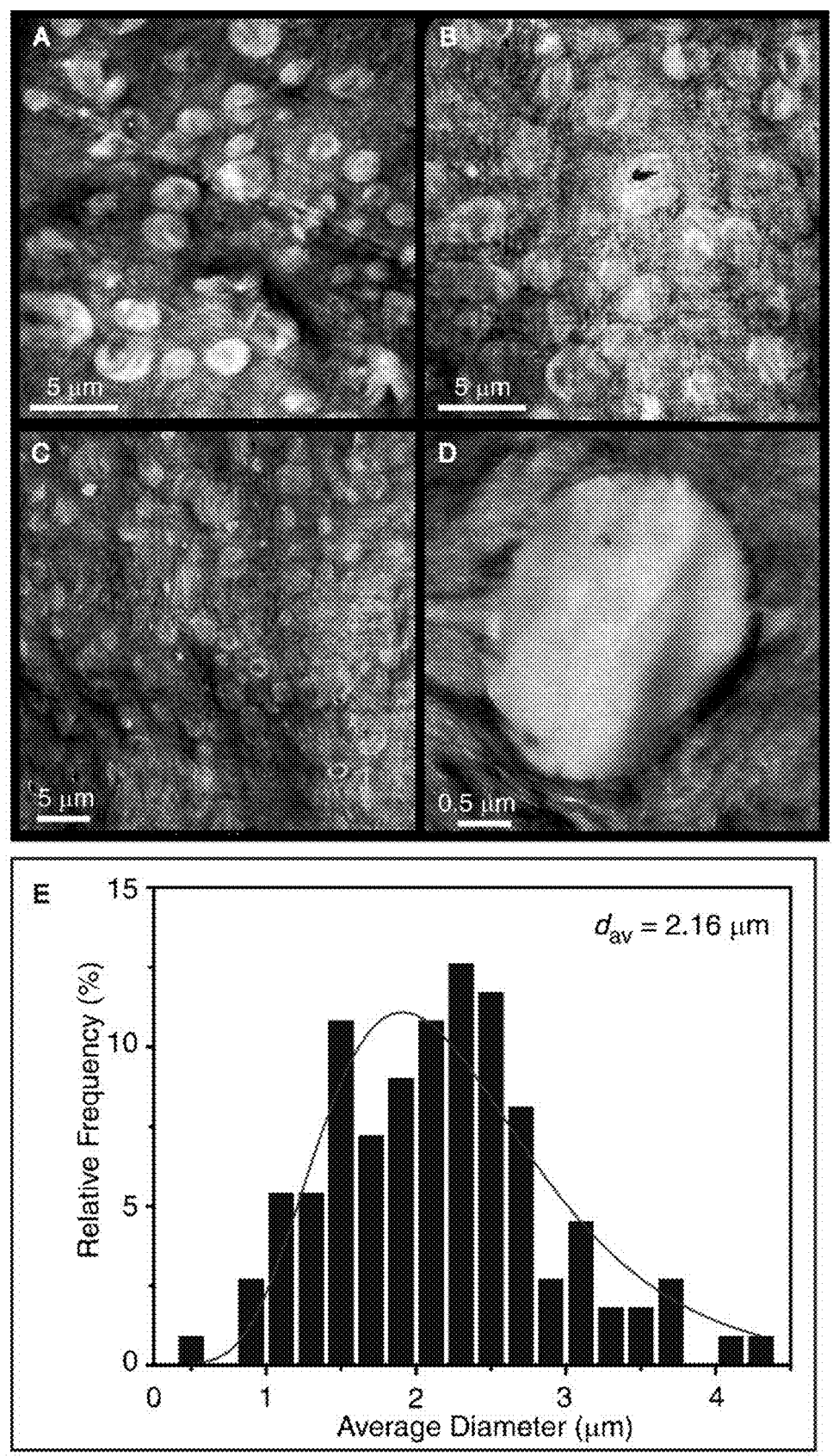
FIGS. 13A-E depict TEM images of a PE/iPP phase separated blend (70:30, PE:iPP) with no block copolymer additive (A-D), and droplet diameter analysis and average diameter of 2.16 μm (E).
Figure 14:
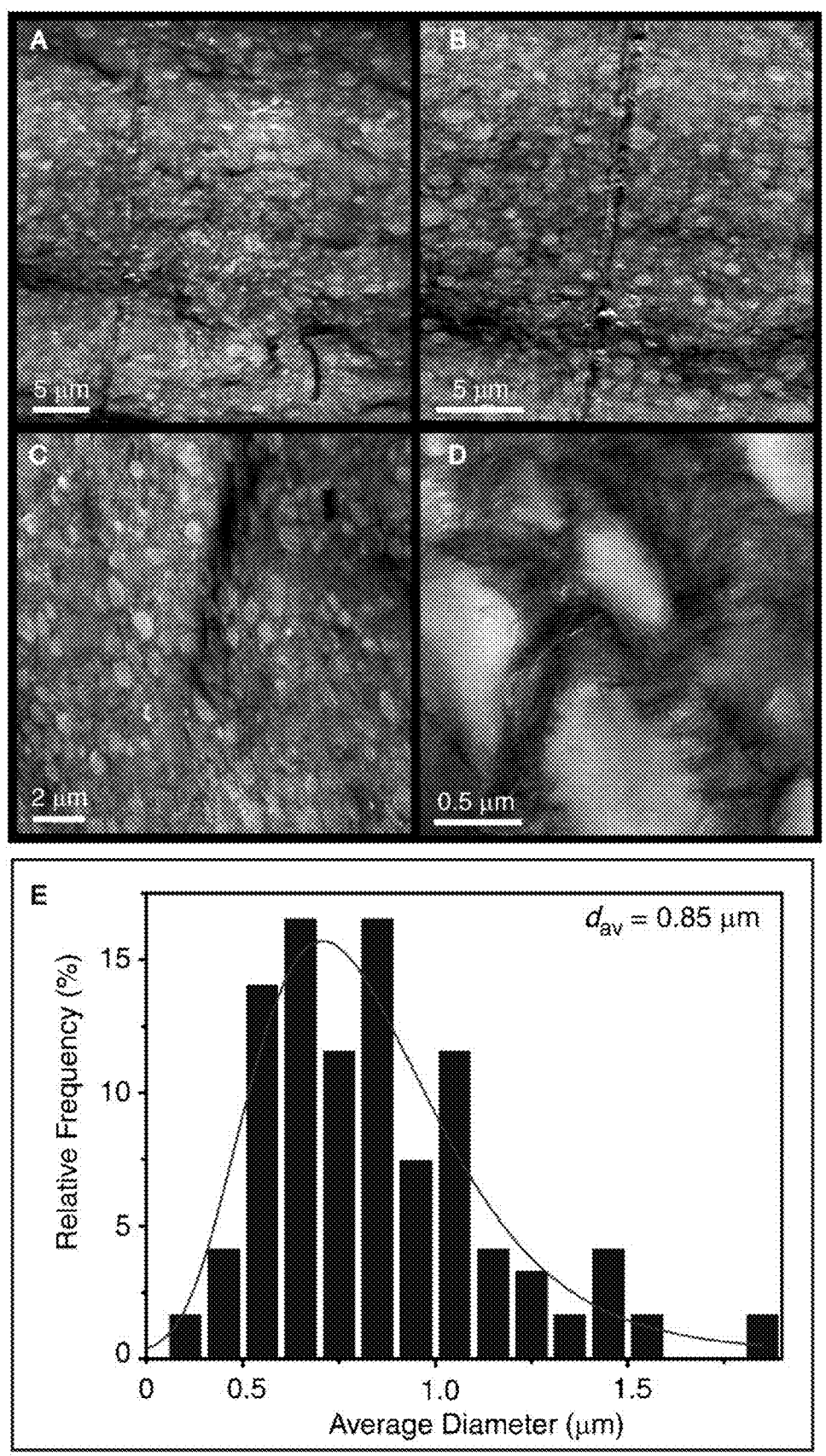
FIGS. 14A-E depict TEM images of a PE/iPP compatibilized blend (70:30, PE:iPP) with 5 wt % diblock copolymer ($iPP_{60}PE_{80}$) additive (A-D), and droplet diameter analysis and average diameter of 0.85 μm (E).
Figure 15:
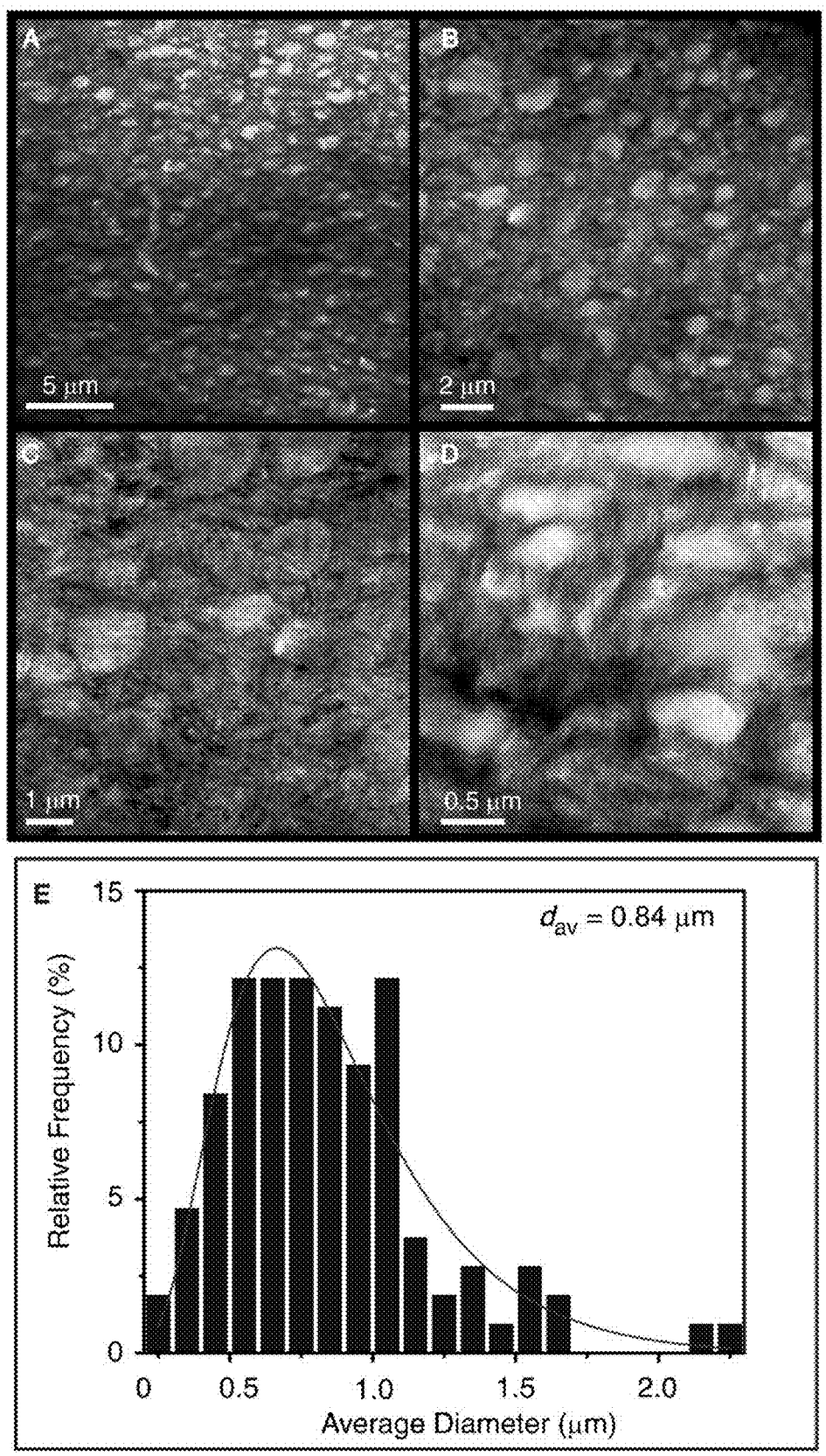
FIGS. 15A-E depict TEM images of a PE/iPP compatibilized blend (70:30, PE:iPP) with 5 wt % triblock copolymer ($iPP_{60}PE_{80}iPP_{75}$) additive (A-D), and droplet diameter analysis and average diameter of 0.84 μm (E).
Figure 16:
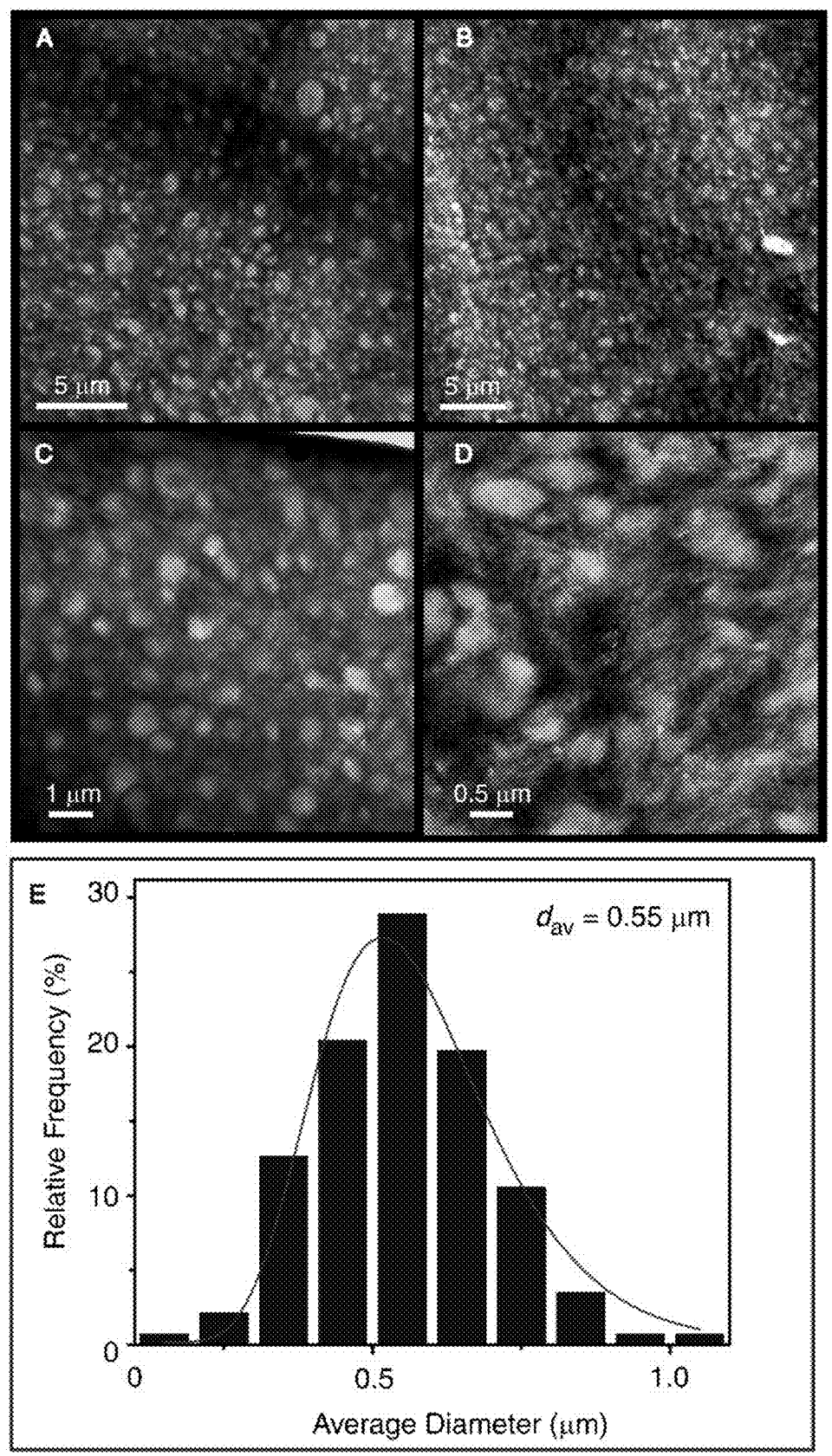
FIGS. 16A-E depict TEM images of a PE/iPP compatibilized blend (70:30, PE:iPP) with 5 wt % tetrablock copolymer (iPP$_{60}$PE$_{80}$iPP$_{75}$PE$_{90}$) additive (A-D), and droplet diameter analysis and average diameter of 0.55 µm (E).

Mechanical studies were performed using a Zwick/Roell tensile tester elongated with a crosshead velocity of 16 mm/min. Tensile bars were elongated until break and at least five tensile bars were tested for each composite. Results were analyzed using Zwick/Roell testXpert II-v. 3.5 software. Representative traces are presented in FIG. 12 and compiled individual traces are presented in FIG. 19.

Figure 19:
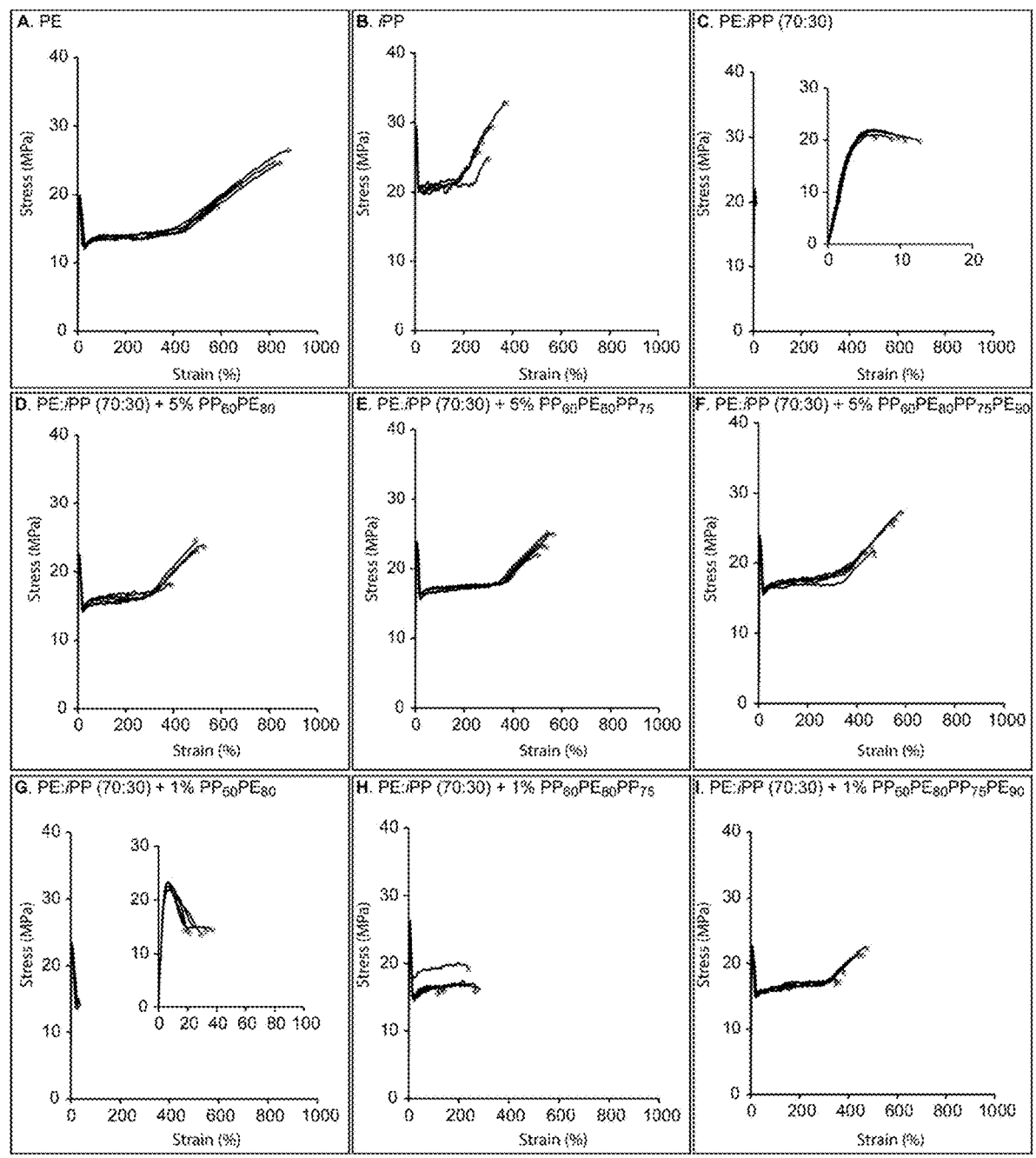
FIGS. 19A-I provide compiled uniaxial tensile elongation of (19A) PE, (19B) iPP, and (19C) PE/iPP blend (70:30, PE:iPP). (19D) Compiled tests of PE/iPP blend with the addition of (19D) 5 wt % and (19G) 1 wt % diblock copolymer, (19E) 5 wt % and (19H) 1 wt % triblock copolymer, (19F) 5 wt % and (19I) 1 wt % tetrablock copolymer. Materials were melt blended at 180° C., then processed by a twin-screw microcompounder at 190° C. and compression molded into tensile specimens at 180° C. The samples were strained at a rate of 100%/min at 25° C.

FIG. 12A shows the morphology obtained from a heterogeneous grade polyolefin blend containing 70 wt % PE and 30 wt % iPP and FIG. 12B illustrates the consequences of adding 5 wt % of tetrablock PP$_{60}$PE$_{80}$PP$_{75}$PE$_{90}$ to this mixture. As described above, materials were melt blended at 190° C. without block copolymer or with 1 wt % diblock, tetrablock, or 5 wt % tetrablock then compression molded into tensile specimens at 180° C., and strained at a rate of 100%/min (FIG. 19). TEM images of PE/iPP blends show droplet morphology (12A) without block copolymer and (12B) with 5 wt % tetrablock copolymer. Interfacial activity of the block copolymer is evidenced by a reduction in the average droplet size from 2.2 μm to 0.55 μm with the addition of the tetrablock copolymer; similar results were obtained with other architectures (see FIGS. 13-16).

Figure 17:
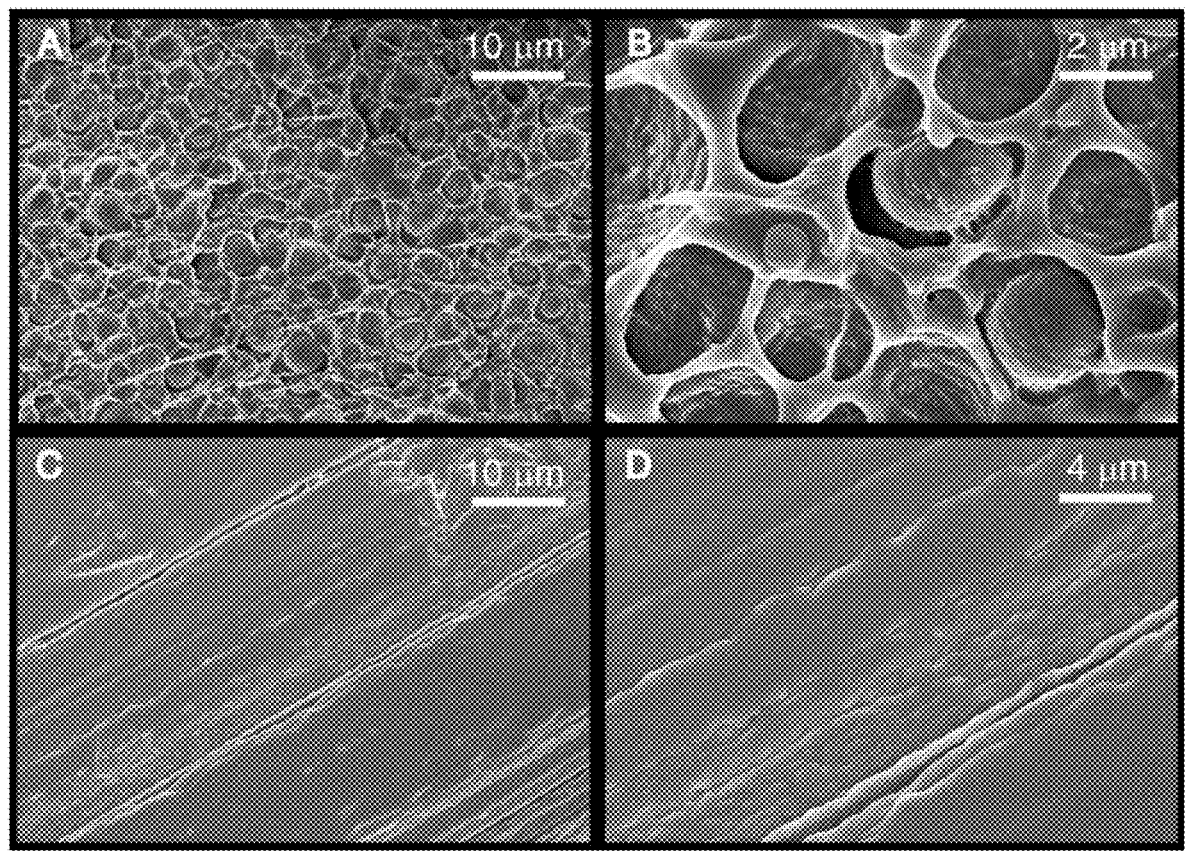
FIGS. 17A-B depict SEM images of PE/iPP uncompatibilized blends (70:30, PE:iPP) after uniaxial tensile testing showing iPP droplet pullout.
FIGS. 17C-D are SEM images of PE/iPP compatibilized blends (70:30, PE:iPP) with 5 wt % tetrablock copolymer (PP$_{60}$PE$_{80}$PP$_{75}$PE$_{90}$) after uniaxial tensile testing showing smooth surface indicative of efficient stress transfer between phases.
Figure 18:
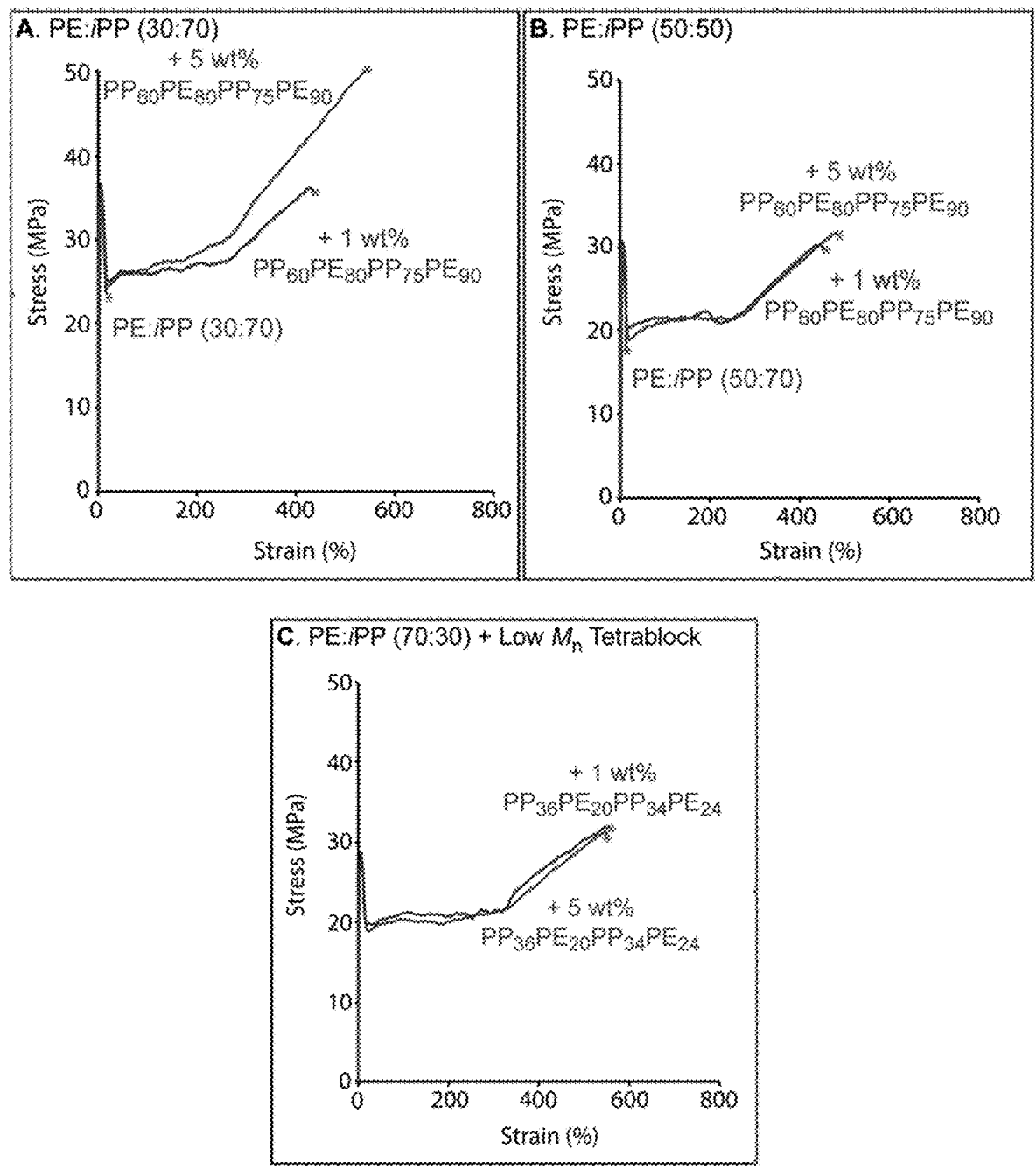
FIGS. 18A-C depict results from compiled uniaxial tensile elongation of HDPE/iPP blends with 1 wt % tetrablock compatibilizer, with 5 wt % tetrablock, and no compatibilizer. Ratios of HDPE:iPP were varied from (18A) 30:70, (18B) 50:50, and (18C) 70:30, the same as FIG. 12, but with the low molecular weight tetrablock copolymer PP$_{36}$PE$_{20}$PP$_{34}$PE$_{24}$ (Entry 4, Table II). All materials were melt blended at 180° C., then processed by a twin-screw microcompounder at 190° C. and compression molded into tensile specimens at 180° C. according the above procedure. The samples were strained at a rate of 100%/min at 25° C.

Individually, pure iPP and PE display ductility and strain hardening when pulled in tension at room temperature (FIG. 12C). Blending the two components leads to a phase separated material and drastic reduction in strain at break ($\varepsilon_b$=12% versus 300% and 800% for iPP and PE, respectively). Addition of 5 wt % PP$_{60}$PE$_{80}$PP$_{75}$PE$_{90}$ raises $\varepsilon_b$=600%, due to the combined effects of interfacial adhesion, reduced particle size, and efficient stress transfer between phases (FIG. 17). With just 1% of this tetrablock copolymer $\varepsilon_b$=450%, while addition of 1 wt % of the corresponding diblock copolymer, PP$_{60}$PE$_{80}$, which leads to a modest improvement, $\varepsilon_b$=90%. The low molecular weight tetrablock polymer PP$_{36}$PE$_{20}$PP$_{34}$PE$_{24}$ exhibited similar properties as did other PE:iPP ratios (FIG. 18).

The foregoing evidence the development of semi-crystalline PE/iPP multiblock copolymers that can be synthesized with precise control over block length and architecture. Embodiments of these macromolecules form strong interfaces with commercial PE and iPP. Two molecular mechanisms are proposed to explain the molecular weight dependence of diblock copolymer adhesion and the behavior of tetrablock copolymers with relatively short blocks. The interfacial strength translates into control over morphology and mechanical toughness in melt blends of commercial PE and iPP, blends that are otherwise brittle at a ratio found in the municipal waste stream.

Multiblock Copolymers as Compatibilizers

Figure 2A:
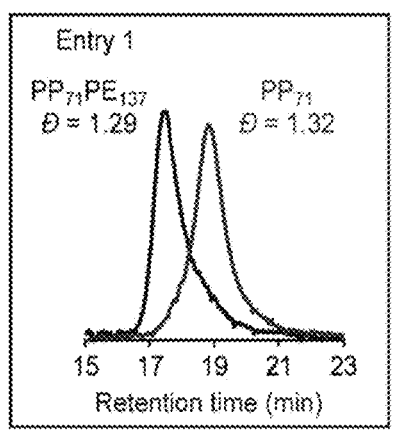
FIGS. 2A-E are charts showing GPC analysis of aliquots and final PE/iPP multiblock copolymers according to certain embodiments of the invention.
Figure 2B:
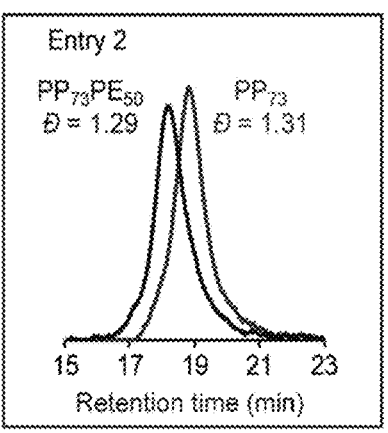
Figure 2C:
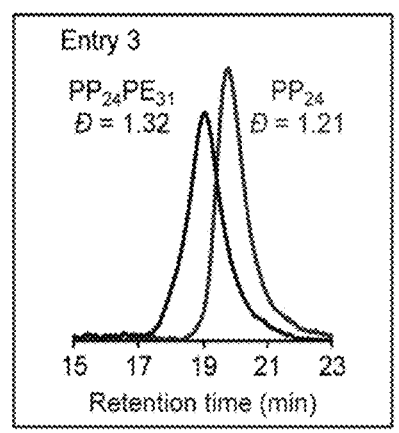
Figure 2D:
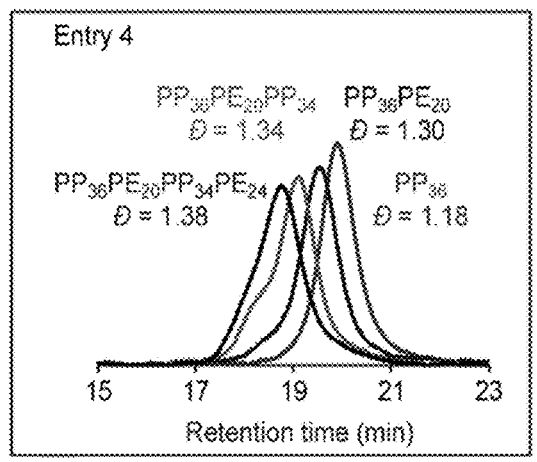
Figure 2E:
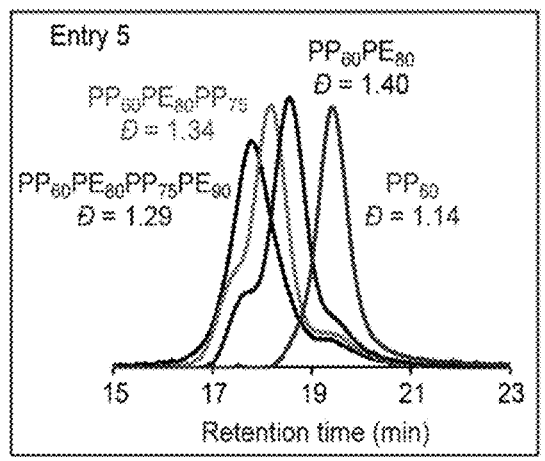

To unambiguously examine the effect of block architecture on compatibilization efficacy and interfacial activity, a single reaction was carried out to synthesize the polymers shown in FIGS. 2A-C with removal of large volumes (50 mL) after monomer consumption to provide adequate yields of each block for physical testing. In a procedure similar to the above general procedure, the cocatalyst mixture (30 μmol) was dissolved in toluene (200 mL) containing DIBAP (125 μmol of a 2.5M solution) in a Fischer-Porter reactor, sealed, and removed from the glove box. The vessel was charged with propylene (2.0 g) and stirred for 90 minutes in a water bath at 22° C. The reactor head was then attached to a quick-connect valve routed to a nitrogen tank and vacuum pump. The vessel was pressurized with nitrogen (1.5 atm) and evacuated under vacuum for 5 seconds before backfilling with nitrogen. This was repeated for a total of three times, then an aliquot (5 mL) was removed for GPC analysis. The reaction vessel was then pressurized with ethylene (2.7 atm) and stirred for 4 minutes prior to venting the ethylene atmosphere. Again the reactor head was attached to a vacuum/nitrogen source and evacuated/backfilled as before. The reaction was stirred for 40 minutes prior to removing a large aliquot (50 mL) via a syringe equipped with a 10-gauge stainless steel needle and quenched by adding to MeOH (50 mL). The sample was vacuum filtered and dried at 60° C. under vacuum for 24 h. Propylene was then condensed, stirred, evacuated/backfilled as above, followed by the removal of a large aliquot (50 mL). The final ethylene polymerization was similarly carried out as above but quenched by the addition of acidic MeOH (50 mL) instead of removing an aliquot. The resulting tetrablock copolymer (entry 5, PP$_{60}$PE$_{80}$PP$_{75}$PE$_{90}$, 4.0 g) was projected to yield 8.5 g of polymer according to the removed volume. No corrections for monomer or polymer volume were made.

Figure 20A:
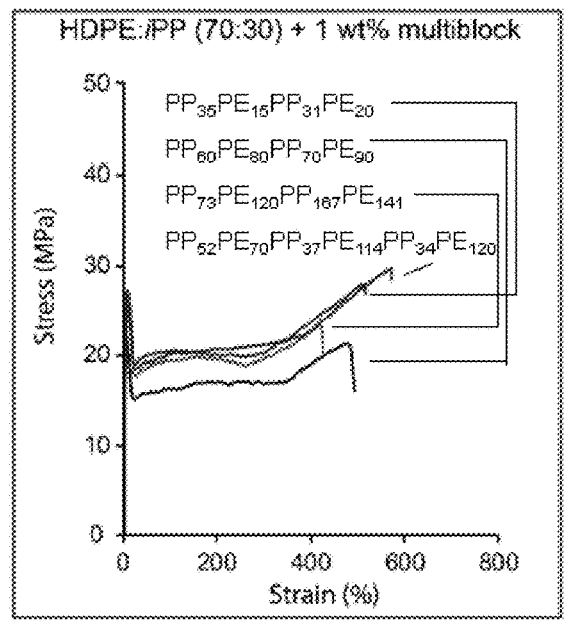
FIGS. 20A-C are charts summarizing tensile properties of 70:30 (HDPE:iPP) blend embodiments with the indicated multiblock copolymers added in 1 wt %, 0.5 wt %, and 0.2 wt %.
Figure 20B:
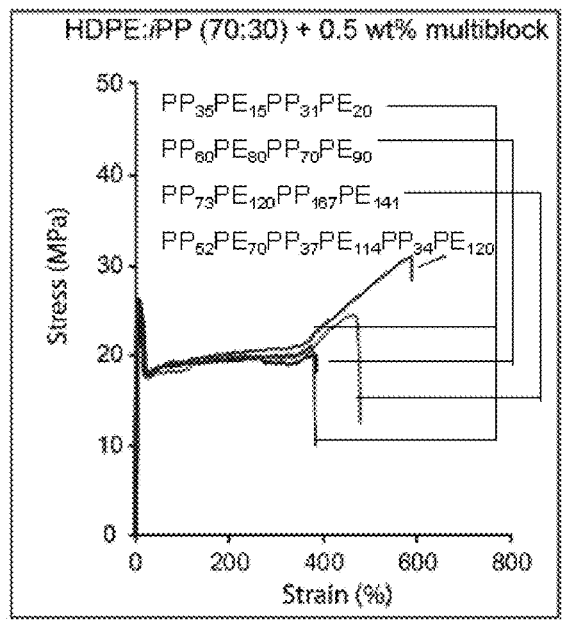
Figure 20C:
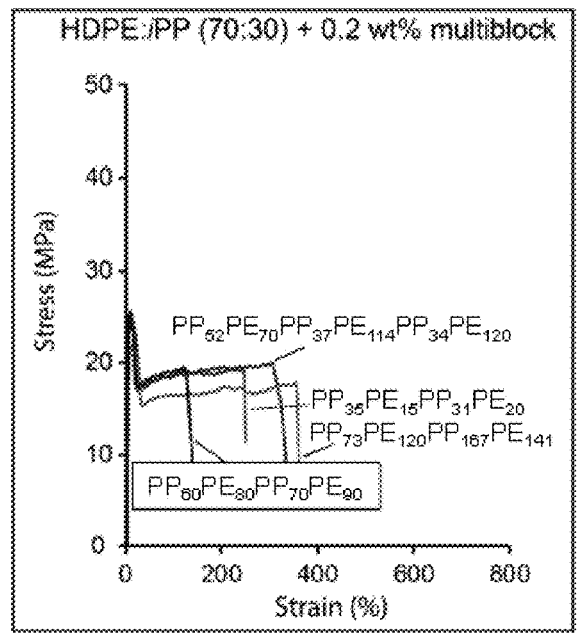

FIGS. 20-22 provide data relative to additional embodiments of compatibilized blends according to the invention. FIGS. 20A-C are charts summarizing tensile properties of 70:30 (HDPE:iPP) blend embodiments with the indicated multiblock copolymers added in 1 wt %, 0.5 wt %, and 0.2 wt %. Three different tetrablocks with different molecular weights and one hexablock were tested as compatibilizers. As illustrated, tensile properties were dramatically improved (>10 fold improvement in strain at break in all cases). Only a single representative trace is shown. FIGS. 21A-E are charts summarizing tensile properties of 70:30 (HDPE:iPP) blend embodiments with the indicated multiblock copolymers added in 1 wt %. Individual test samples are provided, in addition to a representative trace. FIGS. 22A-E are charts summarizing tensile properties of 70:30 (HDPE:iPP) blend embodiments with the indicated multiblock copolymers added in 0.5 wt %. Individual test samples are provided, in addition to a representative trace. FIGS. 23A-E are charts summarizing tensile properties of 70:30 (HDPE:iPP) blend embodiments with the indicated multiblock copolymers added in 0.2 wt %. Individual test samples are provided, in addition to a representative trace. The figures demonstrate that, following addition of the inventive semicrystalline multiblock copolymers, compatibility is undeniably improved.

CLAUSES

The following clauses describe certain non-limiting embodiments of the invention.

Clause 1: A semicrystalline multiblock copolymer comprising alternating blocks of semicrystalline isotactic polypropylene (iPP) and semicrystalline polyethylene (PE), having a block arrangement according to formula (I):

$$(iPP_w)_p(PE_x)(iPP_y)_m(PE_z)_n \qquad (I),$$

wherein
p is 0 or 1;
m is 0 or 1;
n is 0 or 1;
the sum of p, m, and n is 1, 2, or 3; and
the sum of w, x, y, and z is greater than or equal to 40 kg/mol, with the provisos that:
when m and n are 0, the sum of w and x is greater than or equal to 140 kg/mol; and
when p and n are 0, the sum of y and x is greater than or equal to 140 kg/mol.

Clause 2. The semicrystalline multiblock copolymer according to clause 1, wherein the copolymer is a diblock copolymer having a block arrangement according to formula (Ia):

$$iPP_w PE_x \qquad (Ia).$$

Clause 3. The semicrystalline multiblock copolymer according to clause 1 or 2, wherein w is greater than 70 kg/mol, and x is greater than 70 kg/mol.

Clause 4. The semicrystalline multiblock copolymer according to any one of clauses 1-3, wherein at least one of w and x is greater than 100 kg/mol.

Clause 5. The semicrystalline multiblock copolymer according to clause 1, wherein the copolymer is a triblock copolymer having a block arrangement according to formula (Ib) or formula (Ic):

$$iPP_w PE_x iPP_y \qquad (Ib)$$

$$PE_x iPP_y PE_z \qquad (Ic).$$

Clause 6. The semicrystalline multiblock copolymer according to clause 5, wherein for formula (Ib), the sum of w, x, and y is greater than or equal to 70 kg/mol, and for formula (Ic), the sum of x, y, and z is greater than or equal to 70 kg/mol.

Clause 7. The semicrystalline multiblock copolymer according to clause 1, wherein the copolymer is a tetrablock copolymer having a block arrangement according to formula (Id):

$$iPP_w PE_x iPP_y PE_z, \qquad (Id).$$

Clause 8. The semicrystalline multiblock copolymer according to clause 7, wherein w, x, y, and z are each independently greater than or equal to 15 kg/mol.

Clause 9. The semicrystalline multiblock copolymer according to clause 7, wherein w, x, y, and z are each independently greater than or equal to 20 kg/mol.

Clause 10. The semicrystalline multiblock copolymer according to clause 7, wherein w, x, y, and z are each independently selected from 10 to 150 kg/mol.

Clause 11. The semicrystalline multiblock copolymer according to clause 7, wherein the sum of w, x, y, and z is greater than or equal to 100 kg/mol.

Clause 12. The semicrystalline multiblock copolymer according to clause 1, having one or more blocks in addition to those of formula (I).

Clause 13. An adhesion layer comprising the semicrystalline multiblock copolymer according to any one of clauses 1 to 12.

Clause 14. A multi-layer film or sheet comprising:
a first layer comprising polyethylene;
a second layer comprising polypropylene; and
an adhesion layer comprising the semicrystalline multiblock copolymer according to any one of clauses 1 to 12,
wherein the adhesion layer is disposed between the first layer and the second layer, and is in direct contact with the first layer and the second layer.

Clause 15. The multi-layer film or sheet according to clause 14, wherein the polyethylene in the first layer is selected from the group consisting of: high density polyethylene (HDPE), linear low-density polyethylene (LLDPE), ultra high molecular weight polyethylene (UHMWPE), low density polyethylene (LDPE), very low density polyethylene (VLDPE), and polyethylene polyolefin block copolymer.

Clause 16. The multi-layer film or sheet according to clause 14 or clause 15, wherein the polypropylene in the second layer is selected from the group consisting of: isotactic polypropylene (iPP), impact modified polypropylene, polypropylene fibers, and biaxially oriented polypropylene (BOPP).

Clause 17. A method of adhering a first layer comprising polyethylene and a second layer comprising polypropylene, the method comprising: contacting the first layer and the second layer with an adhesive composition comprising a semicrystalline multiblock copolymer according to any one of clauses 1 to 12.

Clause 18. The method according to clause 17, wherein the adhesive composition is provided in the form of a film or sheet.

Clause 19. The method according to clause 17, wherein the adhesive composition is applied to the first layer or the second layer by:
blow molding;
electrospinning;
melt extruding;
injection molding;
application through sheer force; or
solvent casting.

Clause 20. A blended composition comprising polypropylene, polyethylene, and a semicrystalline multiblock copolymer according to any one of clauses 1 to 12.

Clause 21. The composition according to clause 20, wherein the polypropylene, polyethylene, and semicrystalline multiblock copolymer are present in a mixture having an average droplet diameter of less than 1 μm.

Clause 22. The composition according to clause 20 or clause 21, comprising 0.2 to 5.0 wt % of the semicrystalline multiblock copolymer.

Clause 23. A process for forming the semicrystalline multiblock copolymer according to any one of clauses 1-12, said process comprising:

in a reactor, in a non-polar, non-protic solvent, contacting propylene monomers with a catalyst, thereby forming an iPP block;

introducing ethylene monomers to the reactor, thereby forming a PE block covalently bonded to the iPP block, thus forming a semicrystalline diblock copolymer;

optionally, performing one or more additional steps of introducing to the reactor propylene and/or ethylene monomers, thus forming a semicrystalline multiblock copolymer having additional blocks.

Clause 24. The process according to clause 23, wherein the solvent is toluene.

Clause 25. The process according to clause 23 or clause 24, wherein the catalyst is the reaction product of a pyridylamidohafnium catalyst precursor and an activator.

Clause 26. The process according to clause 25, wherein the pyridylamidohafnium catalyst precursor is a compound of formula (II)

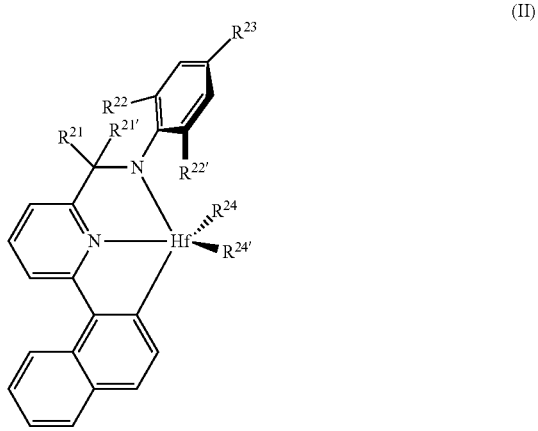

(II)

wherein
$R^{21}$ and $R^{21'}$ are independently selected from H and methyl;
$R^{22}$ and $R^{22'}$ are independently selected from isopropyl and tert-butyl;
$R^{23}$ is selected from H, isopropyl and tert-butyl; and
$R^{24}$ and $R^{24'}$ are independently selected from $C_1$-$C_4$ linear or branched alkyl and benzyl.

Clause 27. The process according to clause 26, wherein the activator is $B(C_6F_5)_3$ and the pyridylamidohafnium catalyst precursor is:

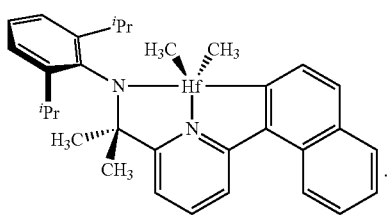

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), "contain" (and any form contain, such as "contains" and "containing"), and any other grammatical variant thereof, are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a composition or article that "comprises", "has", "includes" or "contains" one or more features possesses those one or more features, but is not limited to possessing only those one or more features.

As used herein, the terms "comprising," "has," "including," "containing," and other grammatical variants thereof encompass the terms "consisting of" and "consisting essentially of."

The phrase "consisting essentially of" or grammatical variants thereof when used herein are to be taken as specifying the stated features, integers, steps or components but do not preclude the addition of one or more additional features, integers, steps, components or groups thereof but only if the additional features, integers, steps, components or groups thereof do not materially alter the basic and novel characteristics of the claimed composition, device or method.

All publications cited in this specification are herein incorporated by reference as if each individual publication were specifically and individually indicated to be incorporated by reference herein as though fully set forth.

Subject matter incorporated by reference is not considered to be an alternative to any claim limitations, unless otherwise explicitly indicated.

Where one or more ranges are referred to throughout this specification, each range is intended to be a shorthand format for presenting information, where the range is understood to encompass each discrete point within the range as if the same were fully set forth herein.

While several aspects and embodiments of the present invention have been described and depicted herein, alternative aspects and embodiments may be affected by those skilled in the art to accomplish the same objectives. Accordingly, this disclosure and the appended claims are intended to cover all such further and alternative aspects and embodiments as fall within the true spirit and scope of the invention.

The invention claimed is:

1. A semicrystalline multiblock copolymer comprising alternating blocks of semicrystalline isotactic polypropylene (iPP) and semicrystalline polyethylene (PE), having a block arrangement according to formula (I):

$$(iPP_w)_p(PE_x)(iPP_y)_m(PE_z)_n \qquad (I),$$

wherein
block ($PE_x$) consists of formula

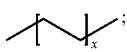

block ($PE_z$) consists of formula

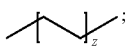

p is 0 or 1;
m is 0 or 1;
n is 0 or 1;
the sum of p, m, and n is 1, 2, or 3; and
the sum of w, x, y, and z is greater than or equal to 40 kg/mol, with the provisos that:
when m and n are 0, the sum of w and x is greater than or equal to 140 kg/mol; and
when p and n are 0, the sum of y and x is greater than or equal to 140 kg/mol.

2. The semicrystalline multiblock copolymer according to claim 1, wherein the copolymer is a diblock copolymer having a block arrangement according to formula (Ia):

$$\text{iPP}_w\text{PE}_x \quad (\text{Ia}).$$

3. The semicrystalline multiblock copolymer according to claim 2, wherein w is greater than 70 kg/mol, and x is greater than 70 kg/mol.

4. The semicrystalline multiblock copolymer according to claim 3, wherein at least one of w and x is greater than 100 kg/mol.

5. The semicrystalline multiblock copolymer according to claim 1, wherein the copolymer is a triblock copolymer having a block arrangement according to formula (Ib) or formula (Ic):

$$\text{iPP}_w\text{PE}_x\text{iPP}_y \quad (\text{Ib})$$

$$\text{PE}_x\text{iPP}_y\text{PE}_z \quad (\text{Ic}).$$

6. The semicrystalline multiblock copolymer according to claim 5, wherein for formula (Ib), the sum of w, x, and y is greater than or equal to 70 kg/mol, and for formula (Ic), the sum of x, y, and z is greater than or equal to 70 kg/mol.

7. A semicrystalline multiblock copolymer comprising alternating blocks of semicrystalline isotactic polypropylene (iPP) and semicrystalline polyethylene (PE), wherein the copolymer is a tetrablock copolymer having a block arrangement according to formula (Id):

$$\text{iPP}_w\text{PE}_x\text{iPP}_y\text{PE}_z, \quad (\text{Id}),$$

wherein
the sum of w, x, y, and z is greater than or equal to 40 kg/mol.

8. The semicrystalline multiblock copolymer according to claim 7, wherein w, x, y, and z are each independently greater than or equal to 15 kg/mol.

9. The semicrystalline multiblock copolymer according to claim 7, wherein the sum of w, x, y, and z is greater than or equal to 100 kg/mol.

10. A semicrystalline multiblock copolymer comprising alternating blocks of semicrystalline isotactic polypropylene (iPP) and semicrystalline polyethylene (PE), having a block arrangement according to formula (I):

$$(\text{iPP}_w)_p(\text{PE}_x)(\text{iPP}_y)_m(\text{PE}_z)_n \quad (\text{I}),$$

wherein
p is 0 or 1;
m is 0 or 1;
n is 0 or 1;
the sum of p, m, and n is 1, 2, or 3; and
the sum of w, x, y, and z is greater than or equal to 40 kg/mol, with the provisos that:
when m and n are 0, the sum of w and x is greater than or equal to 140 kg/mol; and
when p and n are 0, the sum of y and x is greater than or equal to 140 kg/mol, and
wherein said semicrystalline multiblock copolymer includes one or more blocks in addition to those of formula (I).

11. An adhesion layer comprising the semicrystalline multiblock copolymer according to claim 1.

12. A multi-layer film or sheet comprising:
a first layer comprising polyethylene;
a second layer comprising polypropylene; and
an adhesion layer comprising the semicrystalline multiblock copolymer according to claim 1,
wherein the adhesion layer is disposed between the first layer and the second layer, and is in direct contact with the first layer and the second layer.

13. The multi-layer film or sheet according to claim 12, wherein
the polyethylene in the first layer is selected from the group consisting of: high density polyethylene (HDPE), linear low-density polyethylene (LLDPE), ultra high molecular weight polyethylene (UHMWPE), low density polyethylene (LDPE), very low density polyethylene (VLDPE), and polyethylene polyolefin block copolymer; and
the polypropylene in the second layer is selected from the group consisting of: isotactic polypropylene (iPP), impact modified polypropylene, polypropylene fibers, and biaxially oriented polypropylene (BOPP).

14. A method of adhering a first layer comprising polyethylene and a second layer comprising polypropylene, the method comprising: contacting the first layer and the second layer with an adhesive composition comprising a semicrystalline multiblock copolymer according to claim 1.

15. The method according to claim 14, wherein the adhesive composition is provided in the form of a film or sheet and the adhesive composition is applied to the first layer or the second layer by:
blow molding;
electrospinning;
melt extruding;
injection molding;
application through sheer force; or
solvent casting.

16. A blended composition comprising polypropylene, polyethylene, and a semicrystalline multiblock copolymer according to claim 1.

17. The composition according to claim 16, comprising 0.2 to 5.0 wt % of the semicrystalline multiblock copolymer.

18. A process for forming the semicrystalline multiblock copolymer according to claim 1, said process comprising:
in a reactor, in a non-polar, non-protic solvent, contacting propylene monomers with a catalyst, thereby forming an iPP block;
introducing ethylene monomers to the reactor, thereby forming a PE block covalently bonded to the iPP block, thus forming a semicrystalline diblock copolymer;
optionally, performing one or more additional steps of introducing to the reactor propylene and/or ethylene monomers, thus forming a semicrystalline multiblock copolymer having additional blocks.

19. The process according to claim 18, wherein the catalyst is the reaction product of a pyridylamidohafnium catalyst precursor and an activator.

20. The process according to claim 19, wherein the pyridylamidohafnium catalyst precursor is a compound of formula (II)

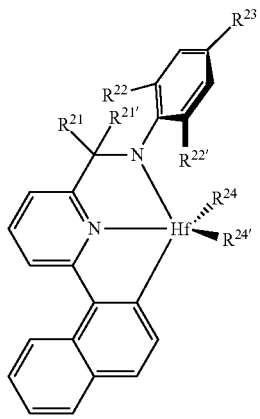

(II)

wherein
- $R^{21}$ and $R^{21'}$ are independently selected from H and methyl;
- $R^{22}$ and $R^{22'}$ are independently selected from isopropyl and tert-butyl;
- $R^{23}$ is selected from H, isopropyl and tert-butyl; and
- $R^{24}$ and $R^{24'}$ are independently selected from $C_1$-$C_4$ linear or branched alkyl and benzyl.

21. The process according to claim 20, wherein the activator is $B(C_6F_5)_3$ and the pyridylamidohafnium catalyst precursor is:

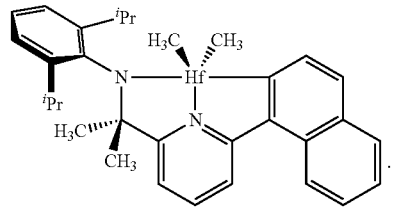

22. The semicrystalline multiblock copolymer according to claim 1, wherein the sum of p, m, and n is 2 or 3.

23. The semicrystalline multiblock copolymer according to claim 1, wherein the semicrystalline multiblock copolymer:
- comprises less than 1 wt % ethylene-co-propylene segments, based on the weight of the multiblock copolymer; and/or
- has an NMR spectrum on which ethylene-co-propylene segments are not detectable.

* * * * *